United States Patent
Yang et al.

(10) Patent No.: US 10,991,054 B2
(45) Date of Patent: Apr. 27, 2021

(54) METHOD AND DEVICE FOR ACQUIRING TRANSACTION RECORD, AND COMPUTER READABLE STORAGE MEDIUM

(71) Applicant: Beijing Xiaomi Mobile Software Co., Ltd., Beijing (CN)

(72) Inventors: Wankun Yang, Beijing (CN); Fang Wang, Beijing (CN); Bo Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 103 days.

(21) Appl. No.: 15/986,825

(22) Filed: May 23, 2018

(65) Prior Publication Data
US 2018/0342019 A1 Nov. 29, 2018

(30) Foreign Application Priority Data

May 27, 2017 (CN) .......................... 201710393062.7

(51) Int. Cl.
*G06Q 40/00* (2012.01)
*G06F 16/33* (2019.01)
(Continued)

(52) U.S. Cl.
CPC .......... *G06Q 40/12* (2013.12); *G06F 16/334* (2019.01); *G06F 16/80* (2019.01); *G06F 16/958* (2019.01)

(58) Field of Classification Search
CPC ...... G06Q 40/12; G06Q 20/389; G06F 16/80; G06F 16/958; G06F 16/334
See application file for complete search history.

(56) References Cited

U.S. PATENT DOCUMENTS 8,027,891 B2 * 9/2011 Preston ................. G06Q 40/12
                                                             705/30
8,244,588 B1 * 8/2012 Ahmed .................. G06Q 30/04
                                                             705/26.1
(Continued)

FOREIGN PATENT DOCUMENTS

CN       101534306 A    9/2009
CN       104268246 A    1/2015
(Continued)

OTHER PUBLICATIONS

J. Veijalainen, V. Terziyan and H. Tirri, "Transaction management for m-commerce at a mobile terminal," 36th Annual Hawaii International Conference on System Sciences, 2003. Proceedings of the, Big Island, HI, USA, 2003, pp. 10 pp.-. (Year: 2003).*
(Continued)

*Primary Examiner* — Ashford S Hayles
(74) *Attorney, Agent, or Firm* — Jun He Law Offices P.C.; James J. Zhu

(57) ABSTRACT

The present disclosure relates to a method and a device for acquiring a transaction record, and a computer readable storage medium, which pertains to the field of internet technology. The method includes: determining a target transaction page to be recognized, the target transaction page originating from an application of a terminal and containing at least one transaction record of at least one transaction event acquiring a Document Object Model (DOM) structure of the target transaction page; and extracting the at least one transaction record from the DOM structure. In the present disclosure, by acquiring the DOM structure of the target transaction page, it may realize automatic extraction of a transaction record in the target transaction page, eliminating the need for the user to manually select a transaction record for extraction one by one. Moreover, the process is simple and will not miss any transaction record. The process may (Continued)

improve the efficiency for acquiring a transaction record, and may extract a huge number of transaction records in a short time. It is more operative and more intelligent.

15 Claims, 21 Drawing Sheets

(51) Int. Cl.
*G06F 16/80* (2019.01)
*G06F 16/958* (2019.01)

(56) References Cited

U.S. PATENT DOCUMENTS

| | | | | |
|---|---|---|---|---|
| 8,639,622 | B1* | 1/2014 | Moore | G06Q 20/00 705/43 |
| 8,706,762 | B1* | 4/2014 | Patzer | G06F 16/9535 707/790 |
| 9,787,597 | B1* | 10/2017 | Miller | G06Q 40/10 |
| 9,916,606 | B2* | 3/2018 | Stroh | G06Q 30/04 |
| 9,934,213 | B1* | 4/2018 | Dutt | G06Q 40/00 |
| 9,977,657 | B2* | 5/2018 | Veltri | G06Q 10/063 |
| 10,019,755 | B1* | 7/2018 | Hanscom | G06Q 30/00 |
| 10,067,915 | B1* | 9/2018 | Mishraky | G06F 16/9577 |
| 10,210,583 | B2* | 2/2019 | Colquitt | G06Q 40/12 |
| 10,275,439 | B2* | 4/2019 | Mizuno | G06F 3/0346 |
| 10,402,896 | B1* | 9/2019 | Lopez | G06Q 40/00 |
| 10,423,657 | B2* | 9/2019 | Pearlman | G06F 16/5866 |
| 10,489,756 | B2* | 11/2019 | Britt | G06Q 20/20 |
| 10,601,744 | B2* | 3/2020 | Sirpal | G06F 3/1454 |
| 2001/0027420 | A1* | 10/2001 | Boublik | G06Q 30/0635 705/26.81 |
| 2004/0220964 | A1* | 11/2004 | Shiftan | G07F 7/1008 |
| 2005/0131768 | A1* | 6/2005 | Rodriguez | G06Q 30/0609 705/4 |
| 2006/0229958 | A1* | 10/2006 | Sergio | G06Q 10/10 705/35 |
| 2008/0008303 | A1* | 1/2008 | Maes | G06Q 10/10 379/114.03 |
| 2008/0046347 | A1* | 2/2008 | Smith | G06Q 20/14 705/30 |
| 2008/0133539 | A1 | 6/2008 | Kaarela et al. | |
| 2009/0210631 | A1* | 8/2009 | Bosworth | G06F 12/0875 711/141 |
| 2009/0271287 | A1* | 10/2009 | Halpern | G06Q 30/02 705/26.1 |
| 2010/0100470 | A1* | 4/2010 | Buchanan | G06Q 10/10 705/35 |
| 2010/0115612 | A1* | 5/2010 | O'Brien | G06F 16/27 726/22 |
| 2010/0241518 | A1* | 9/2010 | McCann | G06Q 30/0603 705/17 |
| 2010/0257066 | A1* | 10/2010 | Jones | G06Q 20/202 705/17 |
| 2011/0276414 | A1* | 11/2011 | Subbarao | G06Q 30/0277 705/14.73 |
| 2012/0173330 | A1* | 7/2012 | Rodin | G06Q 40/00 705/14.49 |
| 2012/0253985 | A1* | 10/2012 | Maron | G06Q 30/06 705/27.1 |
| 2012/0259748 | A1* | 10/2012 | Young | G06Q 40/02 705/34 |
| 2012/0284101 | A1* | 11/2012 | Schiller | G06Q 30/06 705/14.23 |
| 2013/0041819 | A1* | 2/2013 | Khasho | G06Q 40/02 705/42 |
| 2013/0173456 | A1* | 7/2013 | Grigg | G06Q 20/3221 705/39 |
| 2013/0290169 | A1* | 10/2013 | Bathula | H04L 51/38 705/39 |
| 2013/0311875 | A1* | 11/2013 | Pappas | G06F 40/14 715/234 |
| 2013/0332228 | A1* | 12/2013 | Lim | G06Q 30/0603 705/7.29 |
| 2014/0006198 | A1* | 1/2014 | Daly | G06Q 30/06 705/24 |
| 2014/0019317 | A1* | 1/2014 | Casares | G06Q 30/06 705/30 |
| 2014/0040127 | A1* | 2/2014 | Chatterjee | G06Q 20/325 705/41 |
| 2014/0074601 | A1* | 3/2014 | Delug | G06Q 30/02 705/14.53 |
| 2014/0074675 | A1* | 3/2014 | Calman | G06Q 20/047 705/35 |
| 2014/0101002 | A1* | 4/2014 | Schmitt | G06Q 40/12 705/30 |
| 2014/0101004 | A1* | 4/2014 | Marseille | G06Q 40/12 705/30 |
| 2014/0105510 | A1* | 4/2014 | Chelst | G06K 9/6202 382/218 |
| 2014/0180826 | A1* | 6/2014 | Boal | G06Q 30/0245 705/14.66 |
| 2014/0222662 | A1* | 8/2014 | Bierwas | G06Q 20/10 705/39 |
| 2014/0244453 | A1* | 8/2014 | Rephlo | G06Q 30/04 705/30 |
| 2014/0258023 | A1* | 9/2014 | Joa | G06Q 40/00 705/26.7 |
| 2014/0258063 | A1* | 9/2014 | Chourasia | G06Q 30/0201 705/35 |
| 2015/0032602 | A1* | 1/2015 | Blackhurst | G06Q 40/02 705/39 |
| 2015/0032615 | A1* | 1/2015 | Blackhurst | G06Q 20/108 705/42 |
| 2015/0032616 | A1* | 1/2015 | Blackhurst | G06Q 40/02 705/42 |
| 2015/0032642 | A1* | 1/2015 | Blackhurst | G06Q 20/047 705/305 |
| 2015/0073952 | A1* | 3/2015 | Ventura | G06Q 40/12 705/30 |
| 2015/0073959 | A1* | 3/2015 | Connors | G06Q 40/00 705/35 |
| 2015/0088732 | A1* | 3/2015 | DeVan, Jr. | G06Q 40/12 705/39 |
| 2015/0332415 | A1* | 11/2015 | Johansen | G06Q 40/12 705/30 |
| 2016/0019656 | A1* | 1/2016 | Lin | G06Q 40/12 705/30 |
| 2016/0062732 | A1* | 3/2016 | Jaygar | G06F 40/30 707/754 |
| 2016/0071074 | A1* | 3/2016 | Baird | G06Q 20/367 705/40 |
| 2016/0078566 | A1* | 3/2016 | Farrell | G06Q 10/10 705/30 |
| 2016/0247233 | A1* | 8/2016 | Page | G06Q 20/405 |
| 2017/0010765 | A1* | 1/2017 | Sankaranarasimhan | G06N 20/00 |
| 2017/0010790 | A1* | 1/2017 | Glover | G06F 3/14 |
| 2017/0068421 | A1* | 3/2017 | Carlson | G06F 3/04817 |
| 2017/0116679 | A1* | 4/2017 | Abraham | G06Q 40/12 |
| 2017/0132656 | A1* | 5/2017 | Marcus | G06Q 20/32 |
| 2017/0161253 | A1* | 6/2017 | Silver | H04L 67/02 |
| 2017/0193463 | A1* | 7/2017 | Britt | G06Q 20/047 |
| 2017/0200234 | A1* | 7/2017 | Morse | G06F 3/04842 |
| 2017/0364481 | A1* | 12/2017 | Scapa | G06F 40/103 |
| 2018/0012268 | A1* | 1/2018 | Simantov | G06Q 40/12 |
| 2018/0025340 | A1* | 1/2018 | Schlosser | G06Q 20/227 705/24 |
| 2018/0060446 | A1* | 3/2018 | Swedlund | G06F 16/955 |
| 2018/0276287 | A1* | 9/2018 | Kurian | G06F 16/26 |
| 2019/0108595 | A1* | 4/2019 | LeBrun | G06Q 10/04 |

(56) References Cited

U.S. PATENT DOCUMENTS

2019/0258371 A1* 8/2019 Huang .................... G06F 16/00
2020/0192683 A1* 6/2020 Lin .......................... G06F 9/445

FOREIGN PATENT DOCUMENTS

| CN | 104484193 A | 4/2015 |
| CN | 106502617 A | 3/2017 |
| EP | 2388714 A1 | 11/2011 |

OTHER PUBLICATIONS

V. Vadde, Nithya C. H. and A. P. Surhonne, "An NFC based innovation for paperless retail transactions and digital receipts management," 2015 Annual IEEE India Conference (INDICON), New Delhi, 2015, pp. 1-6. (Year: 2015).*

S. A. Sabab, S. S. Islam, M. J. Rana and M. Hossain, "eExpense: A Smart Approach to Track Everyday Expense," 2018 4th International Conference on Electrical Engineering and Information & Communication Technology (iCEEiCT), Dhaka, Bangladesh, 2018, pp. 136-141. (Year: 2018).*

Extended European Search Report of European Patent Application No. 18174225.5, from the European Patent Office, dated Jul. 26, 2018.

The first Office Action of Chinese Patent Application No. 201710393062.7, from the CNIPA, dated Apr. 3, 2020.

The Second Office Action of Chinese Patent Application No. 201710393062.7, from the CNIPA, dated Sep. 10, 2020.

Parag Mulendrajoshi et al: "Web document text and images extraction using DOM analysis and natural anguage processing", DOCENG '09 Proceedings of the 9TH ACM Symposium on Document Engineering, ACM, New York, NY, USA, Sep. 16, 2009 (Sep. 16, 2009), pp. 218-221 , XP058174947, ]DOI: 10.1145/1600193.1600241. ISBN: 978-1-60558-575-8.

The Communication pursuant to Article 94(3) EPC of European Patent Application No. 18174225.5, from the EPO, dated Feb. 18, 2021.

\* cited by examiner

Fig. 5D

METHOD AND DEVICE FOR ACQUIRING TRANSACTION RECORD, AND COMPUTER READABLE STORAGE MEDIUM

CROSS-REFERENCE TO RELATED APPLICATION

This application is based upon and claims priority to Chinese patent application No. 201710393062.7 filed May 27, 2017, which is incorporated herein by reference in its entirety.

TECHNICAL FIELD

The present disclosure relates to the field of internet technology, particularly to a method and a device for acquiring a transaction record, and a computer readable medium.

BACKGROUND

Nowadays, in order to facilitate a user to learn about their own consumption status, after the user performs a transaction operation involving currency transfer through a financial application, a terminal will inform the user in form of a transaction record. For example, if a user triggers a transaction event through a financial application, the application correspondingly generates a transaction record for the transaction event for the user after the transaction event is completed. The transaction record may include information such as a transaction time, a transaction amount, and the like.

In actual scenarios, in order to learn about his or her consumption status over a recent time period or certain time period, the user may generally acquire the transaction records generated for the consumption events, and manage the transaction records. The specific process may be as follows. The user manually searches for transaction bills in the applications storing the transaction records one by one. Afterwards, the user manually exports each transaction record included in the transaction bills provided by the applications. Eventually, the user manually calculates statistical information of all the transaction records, to acquire all the transaction records over a recent time period or certain time period.

In carrying out the present disclosure, the inventors have found at least the following problems existing in the related art.

When the number of transaction records is huge, there may be a risk that the above-mentioned manual acquisition of transaction records may miss part of the transaction records, resulting in a defect that the calculated statistical information about the consumption status is not accurate. In addition, since the user has to manually acquire each transaction record, the operation is complex and cumbersome. Especially when the number of transaction records is huge, it will involve a huge amount of work. Therefore, such method for acquiring a transaction record is low in efficiency.

SUMMARY

In order to solve the above problem existing in the related art, the present disclosure provides a method and a device for acquiring a transaction record, and a computer readable medium. The technical solution is as follows.

According to a first aspect of the embodiments of the present disclosure, there is provided a method for acquiring a transaction record, including:
determining a target transaction page to be recognized, the target transaction page originating from an application of a terminal and containing at least one transaction record of at least one transaction event;
acquiring a Document Object Model (DOM) structure of the target transaction page; and
extracting the at least one transaction record from the DOM structure.

According to a second aspect of the embodiments of the present disclosure, there is provided a device for acquiring a transaction record, including:
a processor; and
a memory for storing instructions executable by the processor;
wherein the processor is configured to:
determine a target transaction page to be recognized, the target transaction page originating from an application of a terminal and containing at least one transaction record of at least one transaction event;
acquire a Document Object Model (DOM) structure of the target transaction page; and
extract the at least one transaction record from the DOM structure.

According to a third aspect of the embodiments of the present disclosure, there is provided a computer readable storage medium having stored therein computer program instructions that, when executed by a processor, perform a method for acquiring a transaction record according to the first aspect.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

FIG. 5D is a schematic diagram of acquiring a detail presenting instruction according to an exemplary embodiment.

DETAILED DESCRIPTION

In order to make the objects, the technical solutions and advantages more clear, the present disclosure will be described in further detail with reference to the embodiments and the accompanying drawings. Here, the illustrative embodiments of the present disclosure and the description thereof are not intended to limit the present disclosure, but to explain the present disclosure.

Before the detailed description of the embodiments of the present disclosure, some terms referred to in the present embodiments will be briefly described.

Figure 1A:
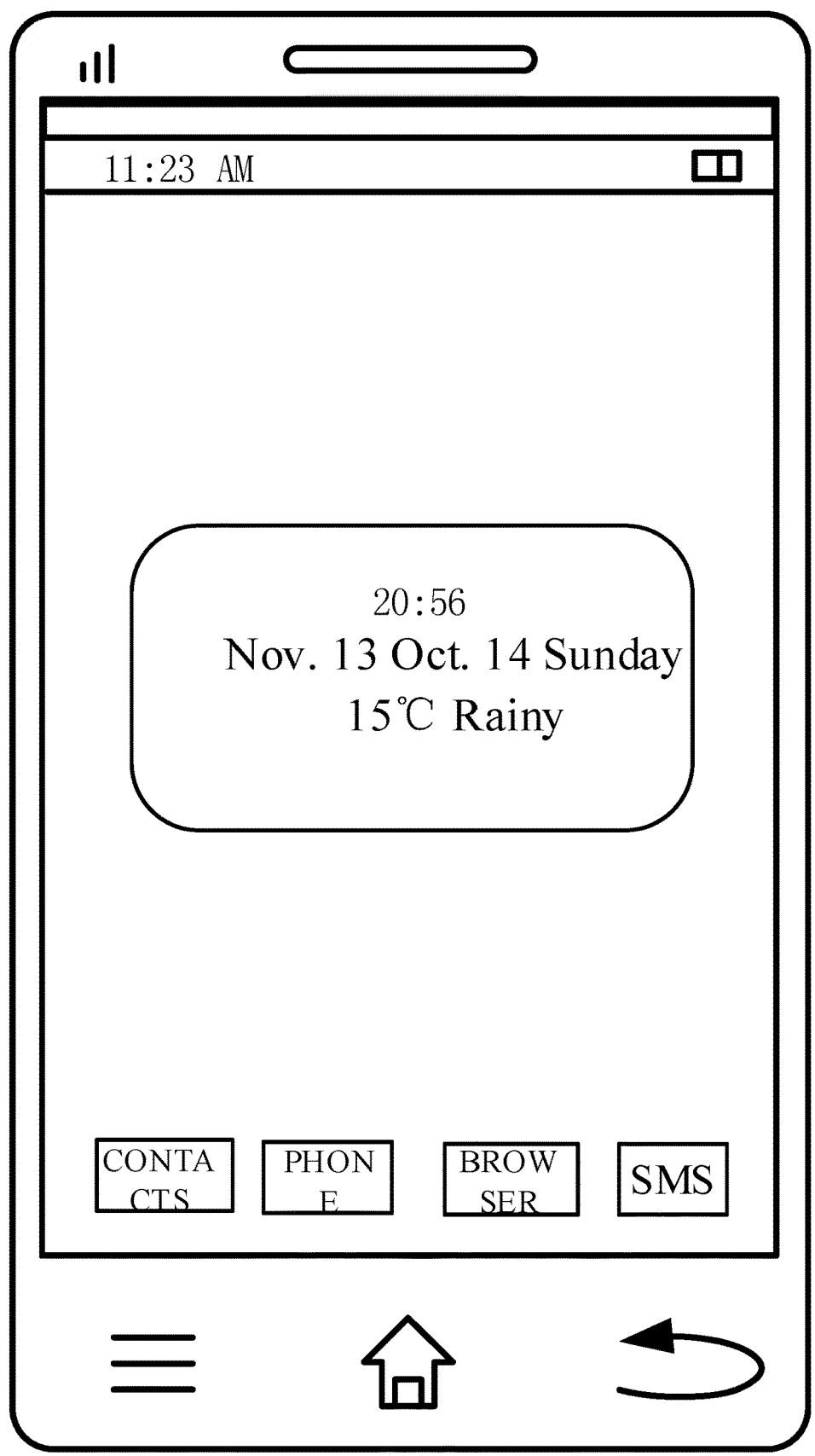
FIG. 1A is a schematic diagram of a main interface according to an exemplary embodiment.
Figure 1B:
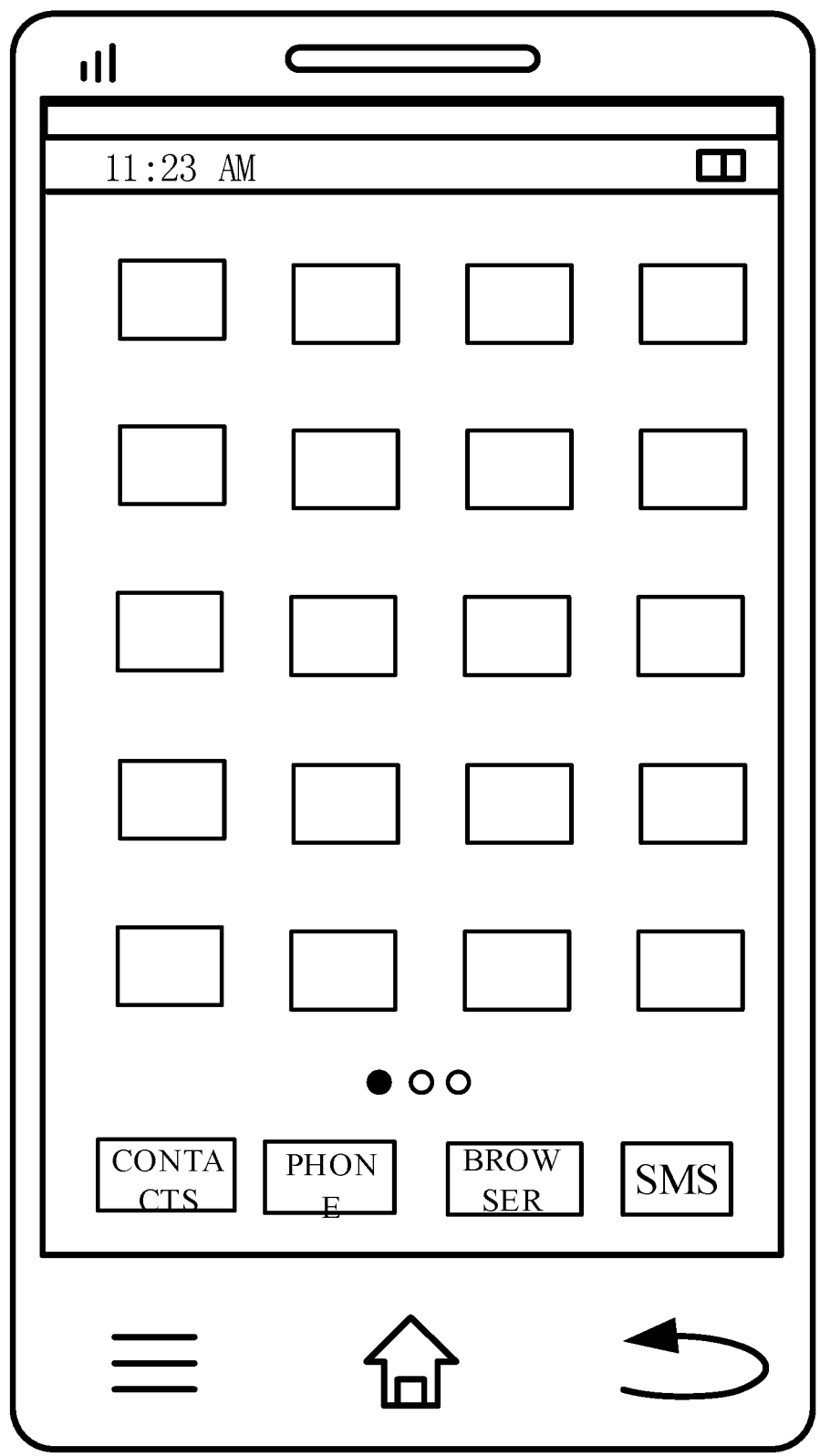
FIG. 1B is a schematic diagram of an interface of applications according to an exemplary embodiment.
Figure 1C:
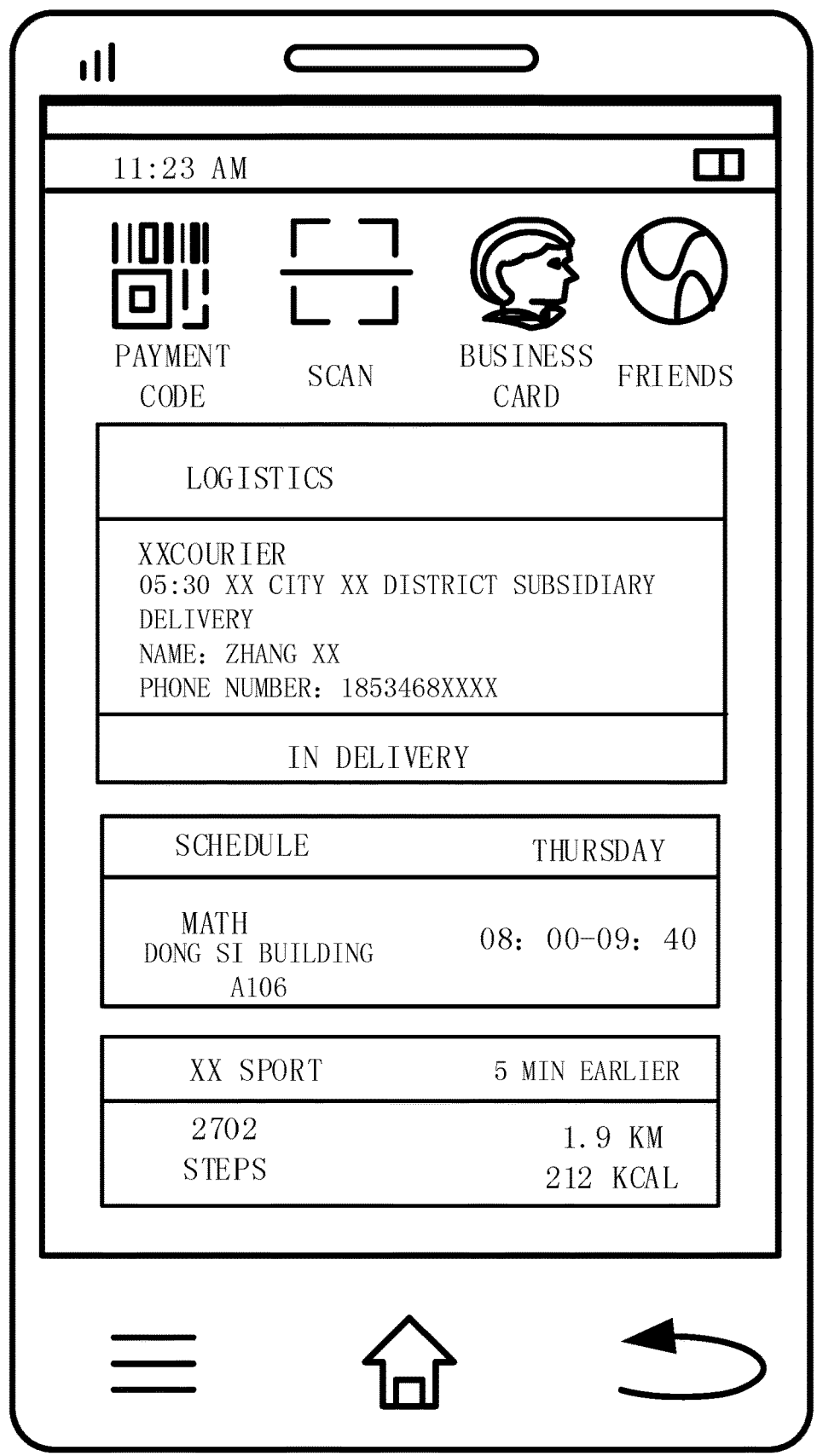
FIG. 1C is a schematic diagram of a Hiboard interface according to an exemplary embodiment.

A designated interface may be a functional interface on the terminal screen other than a main interface as shown in FIG. 1A and an application interface for displaying an installed application as shown in FIG. 1B, also known as a Hiboard screen. The Hiboard screen generally refers to a functional interface leftmost of all the functional interfaces on the terminal screen. When a rightward sliding operation is performed to the main interface, the Hiboard interface may be displayed on the terminal screen. As shown in FIG. 1C, contents displayable in the Hiboard interface may be generally divided into three categories: convenient entries, instant advices, and concerned developments.

The convenient entries include direct entries to all kinds of applications or functions, such as an entry for scanning a code to pay. Through an application recommendation algorithm or a manner of direct access to functions within an application, cumbersome steps for users to find applications or functions may be eliminated, and it may help the user to use the terminal more effectively and more effortless. The instant advice is generally relevant to the current situation of the user. When some conditions are triggered (time, place, in-app behavior, etc.), sufficiently valuable and time effective contents may be provided to the user, including, for example, travel advice, courier tracking, music and radio, train tickets, air tickets, group vouchers, movie tickets, weather warning, daily greetings, schedule reminders, etc.

The concerned developments may provide an experience similar to the desktop gadget, such as network flow statistics or sports information.

Embodiments of the present disclosure provide a method and a device for acquiring a transaction record, and a computer readable medium. Hereinafter, the embodiments of the present disclosure will be described in detail with reference to the accompanying drawings.

Figure 1D:
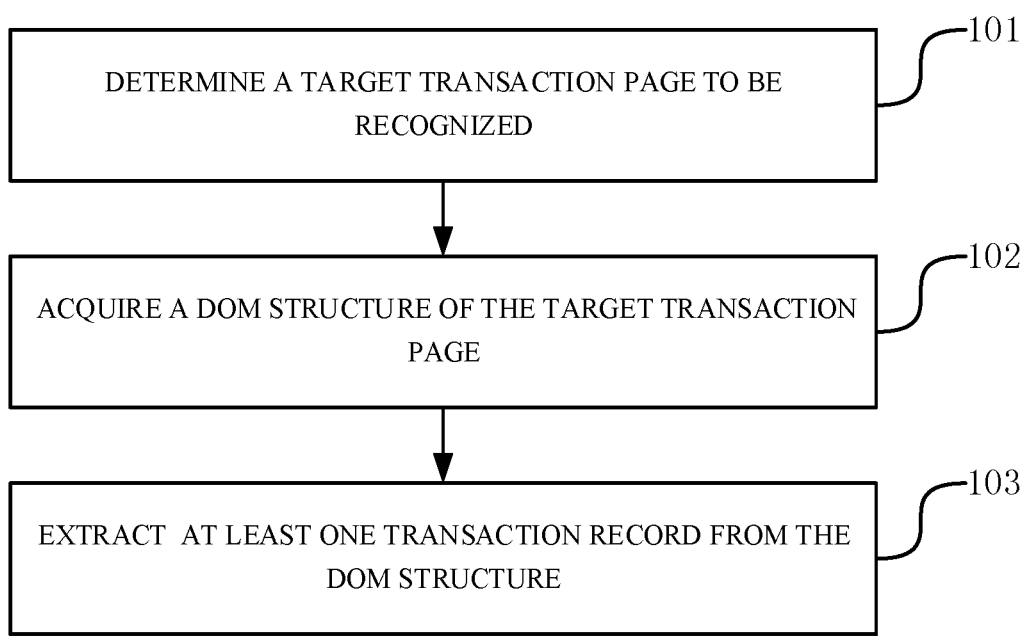
FIG. 1D is a flow chart illustrating a method for acquiring a transaction record according to an exemplary embodiment.

FIG. 1D is a flow chart illustrating a method for acquiring a transaction record according to an exemplary embodiment. As shown in FIG. 1D, the method includes the following steps.

In step 101, a target transaction page to be recognized is determined, the target transaction page originating from an application of the terminal and containing at least one transaction record of at least one transaction event.

In step 102, a Document Object Model (DOM) structure of the target transaction page is acquired.

In step 103, the at least one transaction record is extracted from the DOM structure.

In the method provided in the embodiment of the present disclosure, by acquiring the DOM structure of the target transaction page, automatic extraction of a transaction record in the target transaction page with the DOM structure may be realized, thereby eliminating the need for the user to manually select a transaction record for extraction one by one. Moreover, the process is simple and may not miss any transaction record. It may improve the efficiency for acquiring a transaction record, and may extract a huge number of transaction records in a short time. It is more operative and more intelligent.

In an embodiment, the method further includes the following step.

The at least one transaction record is collected to a transaction card, the transaction card being displayable on a designated interface.

In an embodiment, determining a target transaction page to be recognized includes the following steps.

Designated address link information of the currently displayed page is compared with address link information of at least one transaction page previously stored.

If the designated address link information is consistent with address link information of any one of the at least one transaction page, the currently displayed page is determined as the target transaction page.

In an embodiment, determining a target transaction page to be recognized includes the following steps.

An information import instruction is acquired on a designated page, the designated page being a page displayed when a detail presenting instruction is acquired on a transaction card.

In response to the information import instruction, at least one installed application is displayed.

When a selection instruction for selecting an application of the at least one application is acquired, a historical transaction record page of the selected application is displayed in response to the selection instruction, and the historical transaction record page is determined as the target transaction page.

The historical transaction record page contains at least one historical transaction record.

In an embodiment, extracting the at least one transaction record from the DOM structure includes the following steps.

At least one text node storing a text content is determined in the DOM structure.

The text content stored in the at least one text node is traversed, to acquire a text content to be processed.

According to a preset text rule, a target content is extracted from the text content to be processed, to acquire the at least one transaction record.

In an embodiment, the transaction record at least includes a transaction amount, a transaction occurring time and a transaction name.

All the above optional technical solutions may be combined to form an optional embodiment of the present disclosure in any manner, which will not be repeated herein.

As described above, the embodiment of the present disclosure has expanded the above-mentioned concerned developments, by adding a desktop gadget having a transaction management function. That is, in the embodiment of the present disclosure, in order to facilitate the user to learn about his or her consumption status, an application having a function of managing transaction records is provided, which may be known as a financial assistant. The financial assistant may have a variety of functions, including but not limited to: acquiring transaction records distributed in various financial applications, capturing transaction records of current transaction events, acquiring transaction records of historical transaction events, displaying the transaction records in a uniform form, summarizing and organizing the transaction records. For how the financial assistant acquires the transaction records, embodiments of the present disclosure provide methods such as the following first to third aspects. For how the financial assistant displays the transaction records, embodiments of the present disclosure provide a method such as the following fourth aspect.

In the first aspect, the embodiment of the present disclosure provides a method for acquiring a transaction record from a DOM structure.

This acquisition method may effectively avoid the following situations which present poor user experience. First, since a transaction record cannot be exported and copied, the user needs to manually manage each transaction record. Second, due to the huge number of transaction records involving a huge amount of work, the efficiency of acquisition of transaction records is rather low. Third, since the transaction records are distributed in respective bill list pages of various applications, when searching for certain transaction record, the user may forget which bill list page of which application the transaction record is included, and has to traverse each application to search for the transaction record.

Figure 2A:
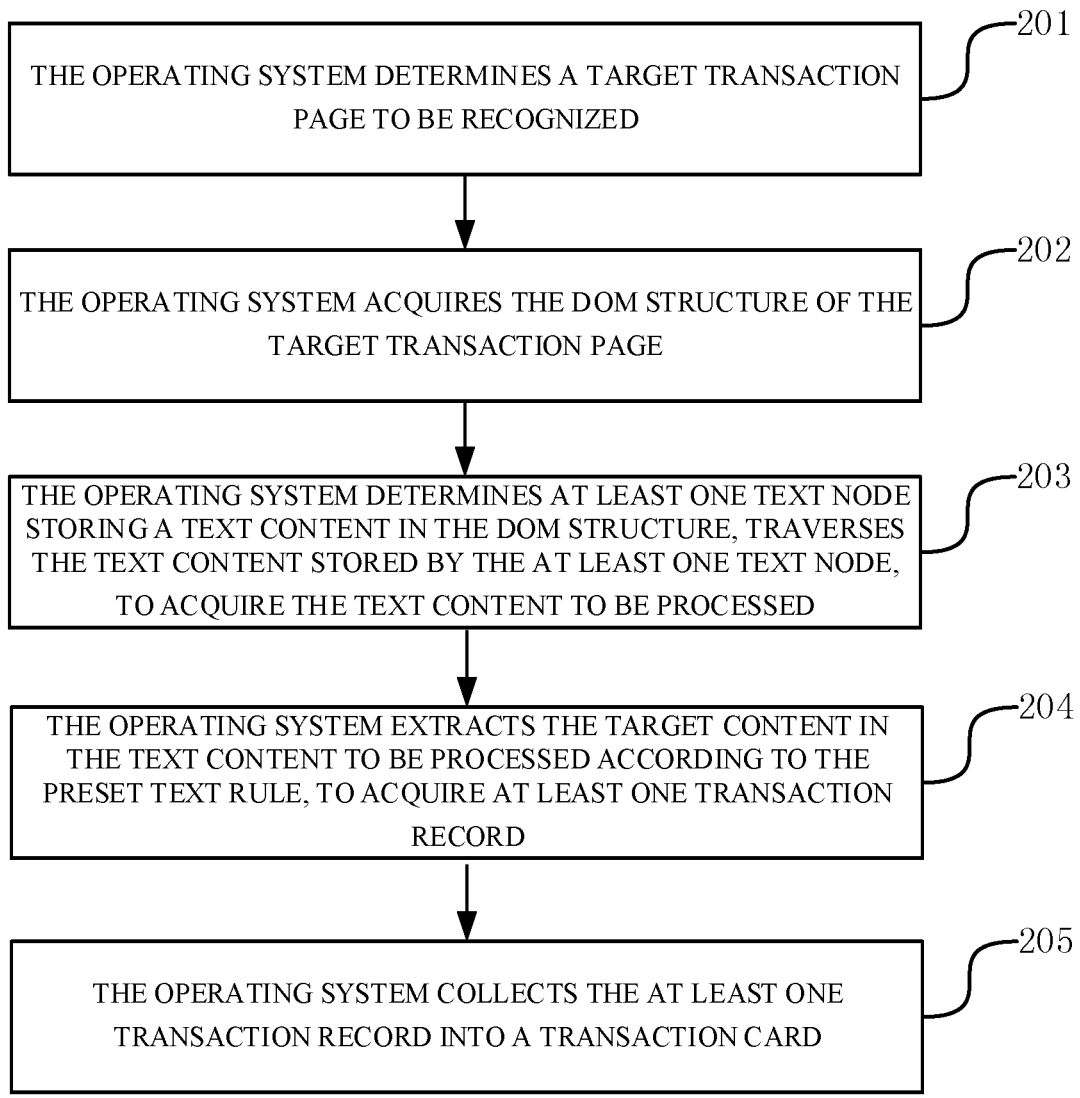
FIG. 2A is a flow chart illustrating a method for acquiring a transaction record according to an exemplary embodiment.

FIG. 2A is a flow chart illustrating a method for acquiring a transaction record from a DOM structure. The method is performed by an operating system of a terminal. The method includes the following steps.

In step 201, the operating system determines a target transaction page to be recognized.

In daily life, the operating system may install a variety of applications, including third-party applications and applications integrated with the operating system. The various applications may be classified into various types according to the functions thereof. For a financial application, the user may trigger a currency transfer operation on the application, and the terminal then transfers the currency owned by that user to another user based on the operation, to complete a transaction event. The terminal may be a mobile phone, a computer, etc. The operation may be payment, collecting a bill, etc. The transaction event may be purchasing, checkout, ordering a meal, receiving a red envelope or sending a red envelope, etc.

When the transaction event is completed, the application generates a transaction record for the transaction event. The transaction record at least includes a transaction amount, a transaction occurring time and a transaction name. For example, the transaction amount may be 100 yuan. The transaction occurring time may be 20:30. The transaction name may be "food". However, the transaction record may also include other information, such as a transaction target. The transaction target may be an identification of a seller or a buyer, such as the name of a store, an avatar of a user, etc.

Figure 2B:
FIG. 2B is a schematic diagram of a transaction page according to an exemplary embodiment.

In another embodiment, in order to inform the user whether the transaction is successfully performed and the current consumption status of the user, the application may also display a transaction page containing the transaction record as shown in FIG. 2B.

Since the transaction page contains the transaction record, in an embodiment of the present disclosure, the operating system may monitor the page and determine whether the currently displayed page is a transaction page. When it is determined that the currently displayed page is a transaction page, the currently displayed page is determined as the target transaction page, to extract a transaction record from the target transaction page.

For the process of determining whether the currently displayed page is a transaction page, the operating system may compare designated address link information of the currently displayed page with address link information of at least one transaction page previously stored. If the designated address link information is consistent with address link information of any one of the at least one transaction page, the currently displayed page is determined as the target transaction page. The address link information may be a URL (Uniform Resource Locator).

In order for the operating system to acquire the address link information of the at least one transaction page, the transaction page of at least one financial application may be manually collected and the address link information of the collected at least one transaction page may be determined, and the at least one piece of address link information may be stored previously in the operating system.

For example, the at least transaction page previously stored may include a transaction page 1 displayed after a bill has been successful paid through a XX wallet application, a transaction page 2 displayed after a meal order is paid through a XX take-out application, a transaction page 3 displayed after a red envelope is sent to a friend through a XX social connection application, and a transaction page 4 displayed after game props are purchased through a XX game application. The operating system may previously store the address link information A of the transaction page 1, the address link information B of the transaction page 2, the address link information C of the transaction page 3, and the address link information D of the transaction page 4. When any one page is displayed, the operating system may compare the address link information of the currently displayed page with the address link information A, B, C and D. Then, when a bill is successfully paid through the XX wallet application, the operating system may acquire the address link information A, and determine the currently displayed page as the target transaction page.

Figure 2C:
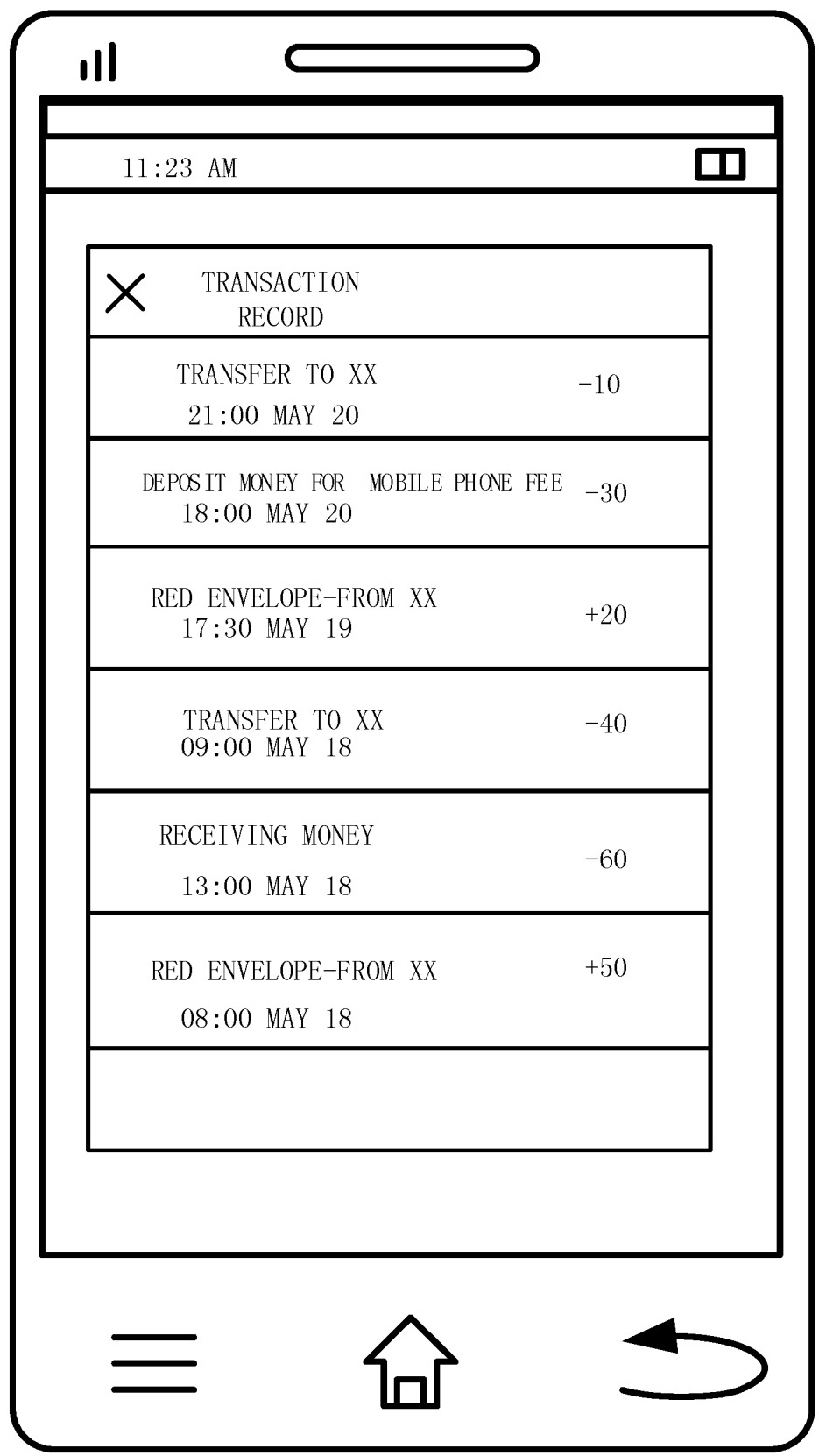
FIG. 2C is a schematic diagram of a transaction page according to an exemplary embodiment.

During the determination of the target transaction page, the target transaction page is the transaction page generated for the current transaction event. In another embodiment, the target transaction page may also be a historical transaction record page generated by at least one historical transaction event, or a bill list page. The historical transaction record page may be shown in FIG. 2C.

Each time an application generates a transaction record, the generated transaction record may be stored as a historical transaction record, and the historical transaction record may be displayed through a historical transaction record page. The historical transaction record page contains at least one historical transaction record. In an embodiment of the present disclosure, the operating system may also determine a historical transaction record page as the target transaction page to be recognized, in order to extract the historical transaction record from the historical transaction record page.

In view of the above, the operating system may acquire an information import instruction on the designated page, and display at least one installed application in response to the information import instruction. When a selection instruction for selecting an application of the at least one application is acquired, in response to the selection instruction, a historical transaction record page of the selected application is displayed, and the historical transaction record page is taken as the target transaction page.

The designated page may be an application interface of the financial assistant. In addition, when the financial assistant is displayed on the designated interface in form of a transaction card and when the user performs a selection operation on a detail presenting option in the transaction card, the operating system may acquire the detail presenting instruction and jump to the designated page. That is, the designated page may be a page displayed after the detail presenting instruction is acquired on the transaction card.

The designated page may provide a designated option for acquiring a historical transaction record page. When the user performs a selection operation on the designated option, the operating system may correspondingly acquire an information import instruction and display at least one installed application. The user may trigger a selection operation on one of the at least one application. If the user selects an application, the operating system may acquire and display the historical transaction record page of the application, and determine the historical transaction record page as the target transaction page.

Figure 2D:
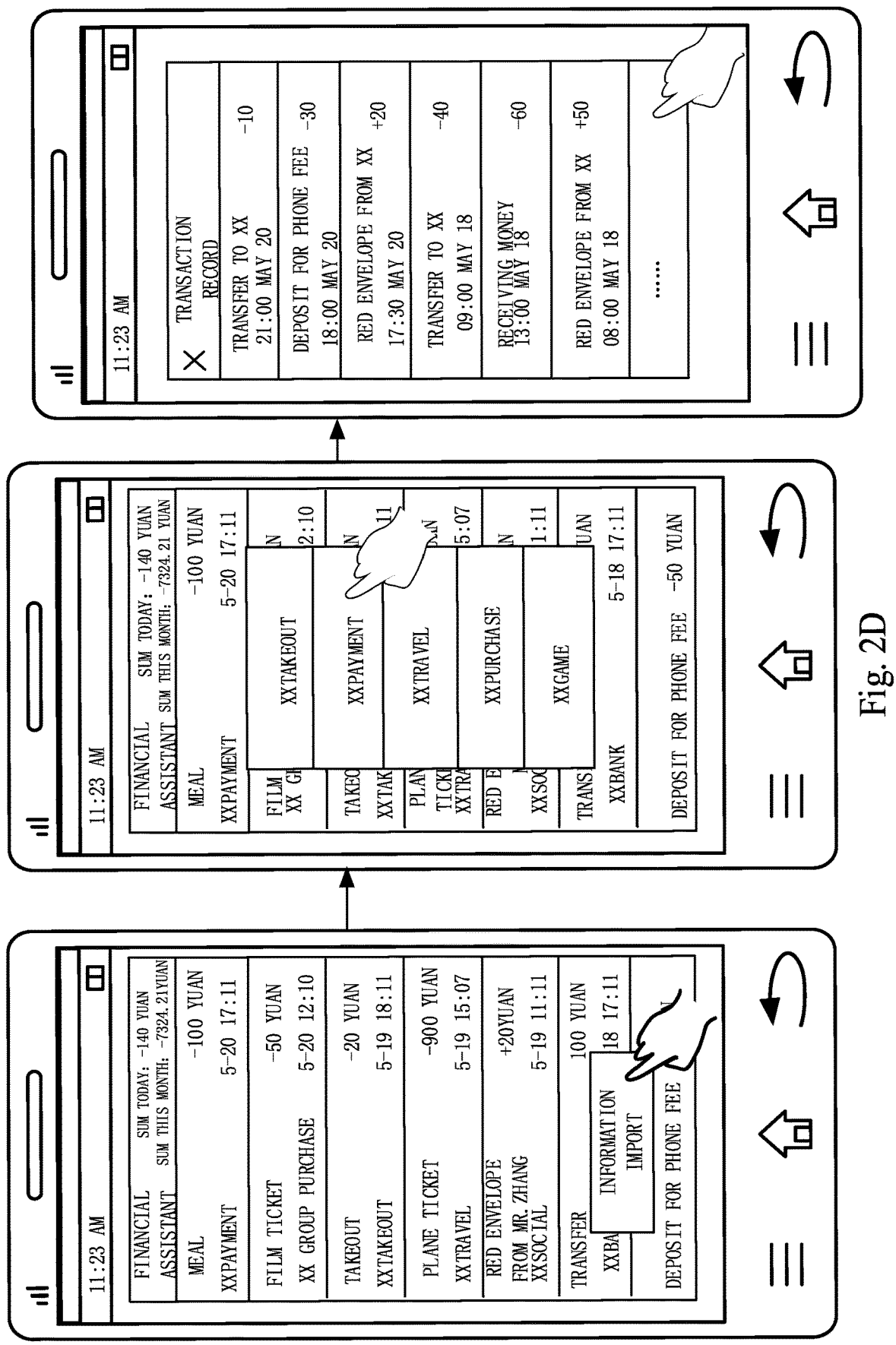
FIG. 2D is a schematic diagram of operations for determining a historical transaction record page according to an exemplary embodiment.

In an exemplary scenario, referring to FIG. 2D, the designated option is an information import option. When the user clicks the information import option, the installed XX take-out application, XX payment application, XX travel application, XX shopping application and XX game application are displayed. When the user selects the XX payment application, the page jumps to the historical transaction record page of the XX payment application.

In step 202, the operating system acquires the DOM structure of the target transaction page.

In practical application, any page may be represented by a DOM structure, and the various contents of the page correspond to various nodes in the DOM structure. In other words, by accessing a node in the DOM structure, the content corresponding to the node may be acquired. Similarly, by acquiring the DOM structure of the target transaction page and accessing the node storing a transaction record, the transaction record may be extracted.

For the process of acquiring the DOM structure, the operating system may acquire the DOM structure during the process of displaying the UI (User Interface) of the target transaction page. Alternatively, the operating system may invoke a DOM interface provided by the target transaction page in Javascript, to acquire the DOM structure of the target transaction page.

In step 203, the operating system determines, in the DOM structure, at least one text node storing a text content, and traverses the text content stored by the at least one text node, to acquire the text content to be processed.

Since the DOM structure essentially organizes the various elements in the page in a tree structure, the DOM structure stores the text contents of the page and the text contents are stored in the at least one node. After the operating system acquires the DOM structure, the operating system traverses each text node in the DOM structure, and in turn extracts the text content in the at least one text node, in order to extract the at least one transaction record in the DOM structure.

For the process of traversing the at least one text node, for each text node in the at least one text node, the operating system may acquire the node identification of the text node in advance, and then reads the text content stored in the text node according to the acquired node identification. The node identification is used to determine the corresponding text node in the DOM structure, and may be an ID (identification), a name, a tagname (tag name) and a classname (class name) of the text node, and so on. Then, via the acquired at least one node identification, the content stored in each text node may be successively read out, that is, to acquire the text content to be processed.

For the process of reading the text content according to the node identification, the operating system may run a reading instruction corresponding to the node identification in Javascript, to implement the reading operation on the text node, so as to acquire the text content stored in the text node. For example, if the ID of the text node is "text1", the operating system may run document.getElementById (text1), to acquire the returned text content. In another example, the name of the text node is "money", and the operating system may run document.getElementByName (money), to acquire the returned text content.

In step 204, the operating system extracts the target content in the text content to be processed according to the preset text rule, to acquire at least one transaction record.

In the above step 203, in addition to the transaction record in the text content to be processed, the acquired text content to be processed may also include irrelevant information. In order to extract useful information in the text content to be processed, the operating system may extract the target content from the text content to be processed according to the preset text rule, to select the target content containing a transaction record and exclude the interference of the irrelevant information.

In a first embodiment, the operating system may previously store at least one key content template, and the preset text rule is whether there is a match with any one of the at least one key content template. The operating system may traverse the text content to be processed. If a string of characters matches with any one key content template, the string of characters is extracted as the target content, to acquire the transaction record contained in the string of characters.

For example, the key content templates include "pay  yuan", " yuan", and "withdraw  yuan", and the text content to be processed is "pay 100 yuan to Mr. ZHANG through the XX payment application by scanning a code". The operating system traverses text content to be processed, and determines that the string of characters "pay 100 yuan" matches with the "pay  yuan". Then, the operating system may extract this string of character and take "100 yuan" as the transaction record.

In a second embodiment, the operating system may segment the text content to be processed into multiple words, and then semantically analyze the words obtained. If certain word(s) of the multiple words describes a transaction record, the word can be taken as the target content to acquire the transaction record.

The operating system may use a word segmentation method to segment the text content to be processed, so that the text content to be processed is segmented into multiple words, and then the multiple words are input into a classifier for semantic analysis. The classifier may output a word(s) that has a semantic meaning of a transaction record among the multiple words. The classifier may be obtained by training on a large number of sample words, and may classify words according to semantics.

For example, the text content to be processed is "pay 100 yuan to Mr. ZHANG through the XX payment application by scanning a code". The operating system may segment the text content to be processed into "the XX payment application", "Mr. ZHANG", "scanning a code" and "pay 100 yuan". The operating system may input the words to the classifier, and the classifier may determine that the semantic meaning of "pay 100 yuan" is a transaction record and output "pay 100 yuan".

In a third embodiment, in view of that the format of a transaction record is usually in the format of a currency or a numeric, the currency format or numeric format may be taken as the preset text rule. In other words, if a content in the text content to be processed is in a currency format or a numeric format, the content may be extracted as the target content.

It should be noted that in the above implementations, it is assumed that the text content to be processed contains irrelevant information, and a target content is extracted from the content to be processed, for example. In another embodiment, if certain text node in the DOM structure is dedicated to storing a transaction record and does not store irrelevant information, the operating system may read only the text content stored in the text node and directly take the obtained text content as the transaction record without having to extract the target content from the text content.

In step 205, the operating system collects the at least one transaction record into a transaction card.

In an embodiment of the present disclosure, after acquiring the at least one transaction record, the operating system stores the at least one transaction record in a storage space corresponding to the transaction card. That is, the at least one transaction record is collected into the transaction card, so that the transaction record may be displayed through the transaction card during subsequent process. The transaction card is displayed on the designated interface shown above to ensure that the user may view the transaction record quickly and easily.

It is to be noted that, in order to avoid duplicate collection of the same transaction record, the operating system may determine whether each transaction record of the at least one transaction record has been collected before collecting the least one transaction record into the transaction card. If a certain transaction record has been collected, the transaction record is filtered out, and only the transaction records that have not been collected will be collected.

The process of determining whether a transaction record to be collected has been collected may be as follows. The transaction amount and the transaction occurring time of the transaction record are extracted. The transaction amount and the transaction occurring time of each transaction record of all of the transaction records that have been collected may be inquired. If both of the transaction amount and the transaction occurring time match with the transaction amount and the transaction occurring time of certain transaction record that has been collected, it may be determined that the transaction record has been collected.

In the method provided in the embodiment of the present disclosure, by acquiring the DOM structure of the target transaction page, automatic extraction of a transaction record in the target transaction page with the DOM structure may be realized, thereby eliminating the need for the user to manually select a transaction record for extraction one by one. Moreover, the process is simple and may not miss any transaction record. It may improve the efficiency for acquiring a transaction record, and may extract a huge number of transaction records in a short time. It is more operative and more intelligent.

Further, the process of acquiring a transaction record from the application may be executed in background of the operating system without affecting the user's use of the application, avoiding interference with the user.

Further, since the process of acquiring the transaction record is performed by the operating system without requiring the user to pay any learning cost, it is more practical.

Further, for the transaction records distributed in various applications, it is possible to extract the transaction records by the method provided in the embodiments of the present disclosure. The method is generally applicable, and may facilitate the user to manage and make statistics of the various transaction records of the user in a unified manner, eliminating the need for the user to manually search the various applications for the transaction records. Thus it may improve the customer stickiness.

In view of the above, the above describes the method for acquiring a transaction record from a DOM structure. In addition, an embodiment of the present disclosure also supports acquiring a transaction record by node injection.

In a second aspect, the embodiment of the present disclosure provides a method for acquiring a transaction record by node injection.

Figure 3:
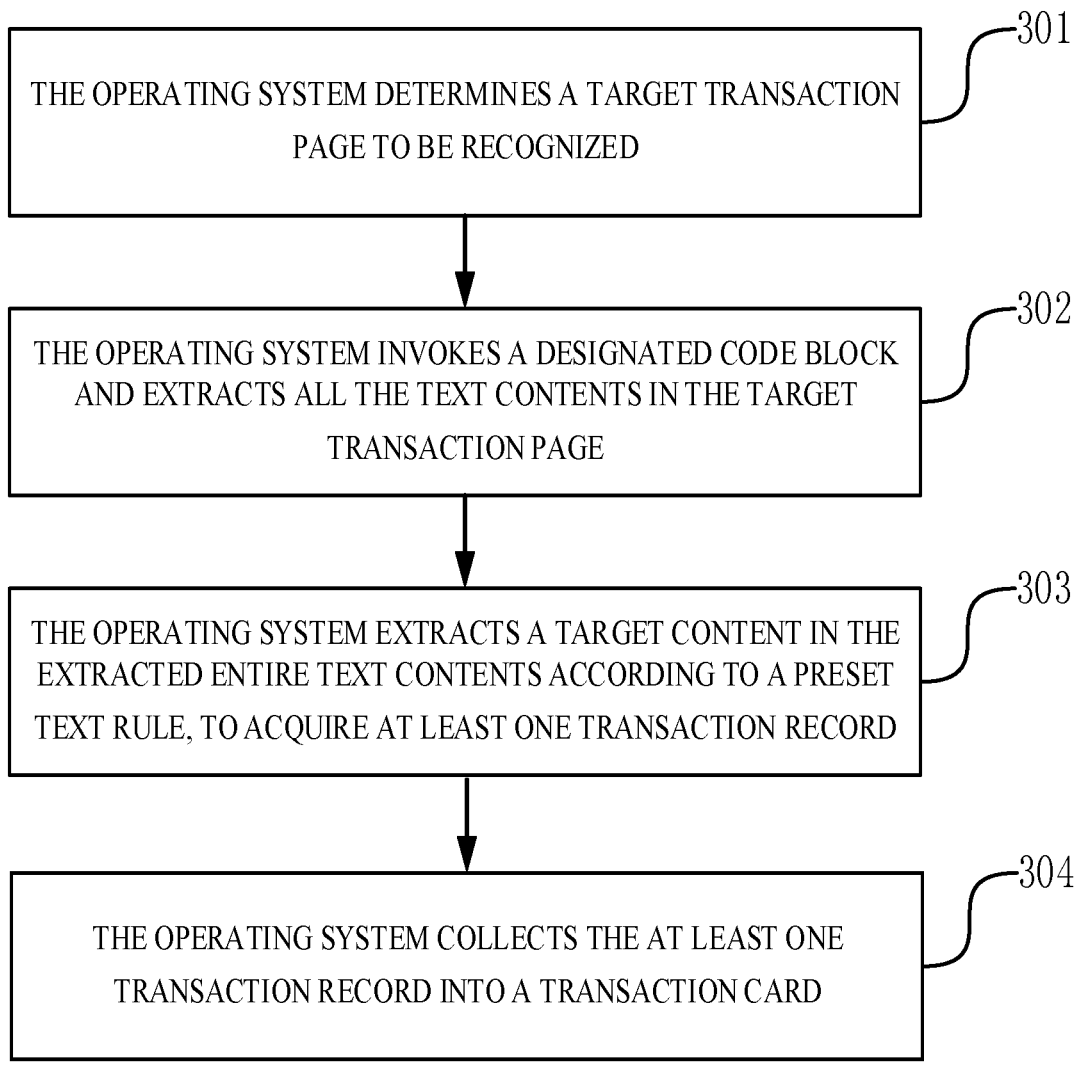
FIG. 3 is a flow chart illustrating a method for acquiring a transaction record according to an exemplary embodiment.

Referring to FIG. 3, FIG. 3 is a flow chart illustrating a method for acquiring a transaction record according to an exemplary embodiment.

In step 301, the operating system determines a target transaction page to be recognized.

This step is similar to the above step 201 and will not be repeated herein.

In step 302, the operating system invokes a designated code block and extracts all the text contents in the target transaction page.

In another embodiment, the above designated code block is injected by the operating system during the loading of the target transaction page.

In an embodiment of the present disclosure, the operating system previously stores a designated code block for extracting all the text contents in the target transaction page. From the perspective of the code format, the designated code block may include javascript, vbscript, python and other formats. From the perspective of the input parameter and output parameter, the input parameter of the designated code block is an identification of the text contents, and the output parameter is the text contents corresponding to the identification. The designated code block may be set by the developer in the operating system or downloaded from a server by the operating system.

When the loading of the target transaction page is completed or the target transaction page is being loaded, the operating system reads the designated code block from the storage location of the designated code block and injects the designated code block into the target transaction page so as to extract the entire text contents of the target transaction page by invoking the designated code block.

During the process of injecting the designated code block to the target transaction page, the operating system may invoke a code injection function, and embed the designated code block into the code injection function. By running the code injection function, the designated code block is injected into the target transaction page.

In an embodiment of the present disclosure, the operating system previously determines the identification of the text contents and takes the identification of the text contents as the input parameter of the designated code block. After the designated code block is invoked, the designated code block may traverse the entire contents in the target transaction page according to the determined identification of the text contents, extract the text contents and return the text contents.

The identification of the text contents may be a name, a type or the like of the text contents. For example, an identification of the text is text1, and the operating system may invoke getElementById (text1), to obtain the text contents corresponding to text1.

In step 303, the operating system extracts a target content in the extracted entire text contents according to a preset text rule, to acquire at least one transaction record.

This step is similar to the above step 204 and will not be repeated herein.

In step 304, the operating system collects the at least one transaction record into a transaction card.

This step is similar to the above step 205 and will not be repeated herein.

In the method provided by the embodiment of the present disclosure, a designated code block is invoked and injected into the target transaction page, and the extraction of the transaction record from the target transaction page may be implemented automatically by the injected designated code block, thereby eliminating the need for the user to manually select a transaction record for extraction one by one. Moreover, the process is simple and may not miss any transaction record. It may improve the efficiency for acquiring a transaction record, and may extract a huge number of transaction records in a short time. It is more operative and more intelligent.

Further, the process of acquiring a transaction record from the application may be executed in background without affecting the user's use of the application, avoiding interference with the user.

Further, since the process of acquiring the transaction record is performed by the operating system without requiring the user to pay any learning cost, it is more practical.

Further, for the transaction records distributed in various applications, it is possible to extract the transaction records by the method provided in the embodiments of the present disclosure. The method is generally applicable, and may facilitate the user to manage and make statistics of the various transaction records of the user in a unified manner, eliminating the need for the user to manually search the various applications for the transaction records. Thus it may improve the customer stickiness.

In view of the above, the above describes the method for acquiring a transaction record by node injection. In addition, an embodiment of the present disclosure also supports acquiring a transaction record by Optical Character Recognition (OCR).

In a third aspect, the embodiment of the present disclosure provides a method for acquiring a transaction record by OCR.

Figure 4A:
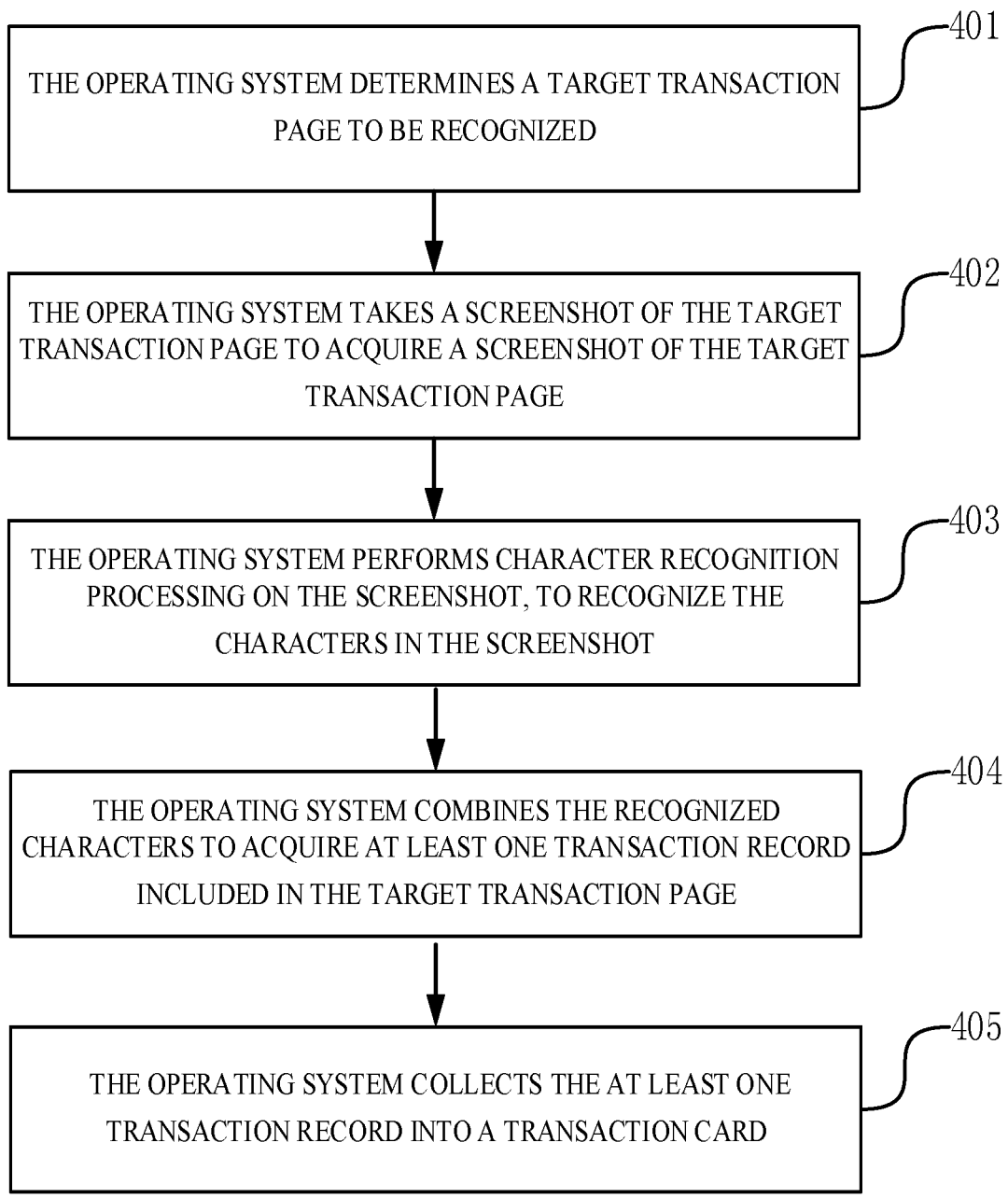
FIG. 4A is a flow chart illustrating a method for acquiring a transaction record according to an exemplary embodiment.

Referring to FIG. 4A, FIG. 4A is a flow chart illustrating a method for acquiring a transaction record according to an exemplary embodiment.

In step 401, the operating system determines a target transaction page to be recognized.

This step is similar to the above step 201, except the following operation. Specifically, when the target transaction record page is a historical transaction record page, after the historical transaction record page is displayed, the user may trigger a cropping operation on the historical transaction record page. After detecting the cropping operation, the operating system takes the left part of the cropped page as the target transaction page. Thus, it may ensure that the target transaction page includes the transaction record the user desires to extract, and excludes information the user does not desire to extract. It may satisfy the self-defined demand of the user, and ensure that the obtained transaction record fits the user demand. However, the user may also take the entire historical transaction page as the target transaction page by an extended screenshot operation.

The process of cropping the historical transaction record page may include the following steps 4011-4013.

In step 4011, an import enabling instruction is acquired on a historical transaction record page.

Figure 4B:
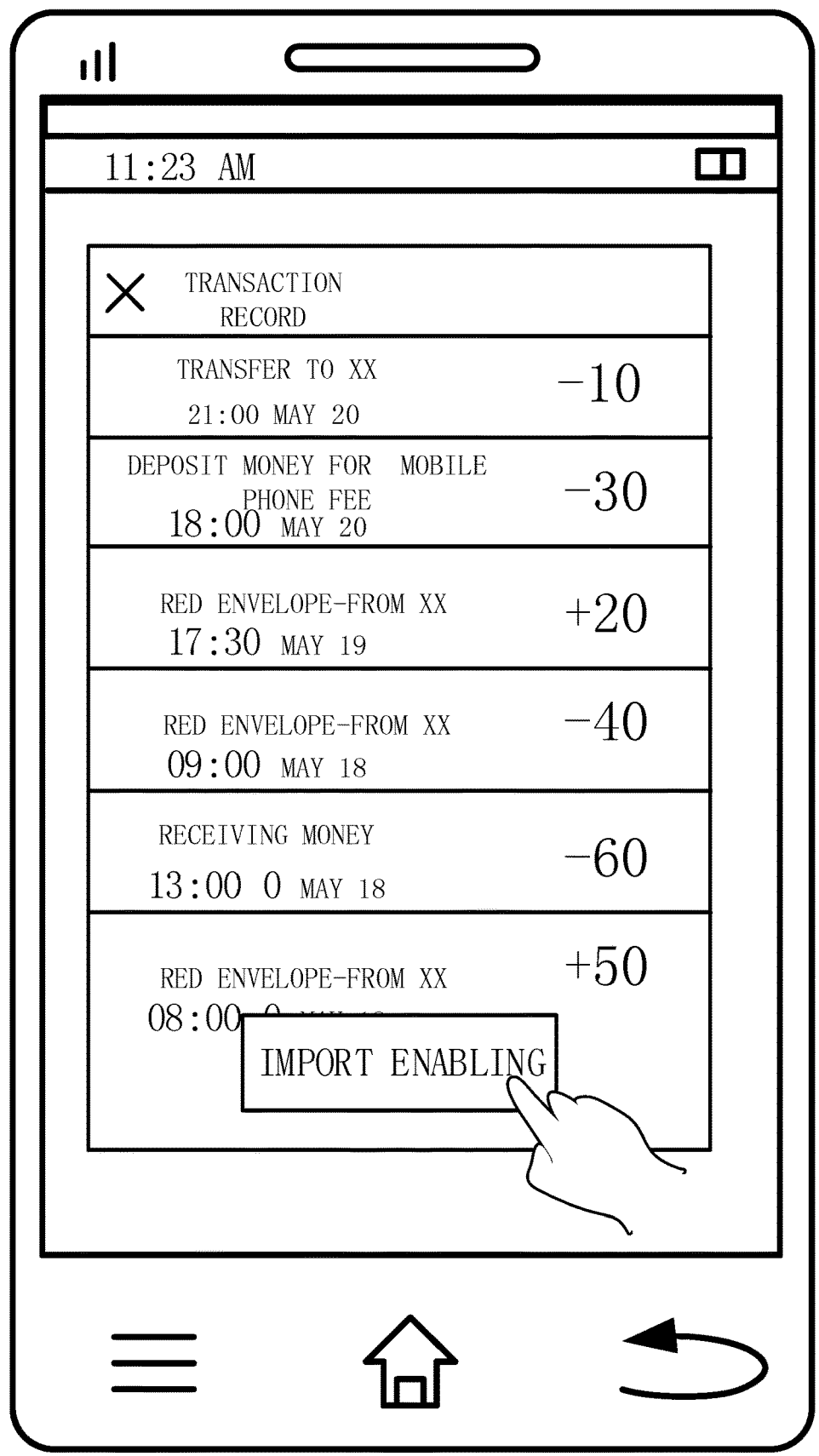
FIG. 4B is a schematic diagram of acquiring an import enabling instruction according to an exemplary embodiment.

The operating system may display a designated option in the historical transaction record page. When the user triggers a confirmation operation on the designated option, the operating system acquires the import enabling instruction. For example, referring to FIG. 4B, the designated option is an import enabling option, and when the user clicks the import enabling option, the operating system acquires the import enabling instruction.

In step 4012, in response to the import enabling instruction, a starting position and an ending position for page cropping are determined on the historical transaction record page.

For the historical transaction record page, the starting position and the ending position may be positions that are currently displayed on the screen, or may be positions to be displayed when a sliding operation is detected. The process of determining the starting position and the ending position may include a plurality of implementations.

In a first embodiment, the operating system may take the top end of the historical transaction record page as the starting position, and the historical transaction record page is displayed in a scrolling manner from top to bottom. When the user triggers an operation to end the scrolling, the operating system takes the bottom end of the currently displayed historical transaction record page as the ending position.

In a second embodiment, the operating system may display a scroll bar in the historical transaction record page, and when the user triggers an upward sliding operation on the scroll bar, the operating system scrolls up the historical transaction record page. When the user triggers a downward sliding operation on the scroll bar, the operating system scrolls down the historical transaction record page. The operating system may take the topmost end of the historical transaction record page that has been scrolled to be displayed as the starting position, and the bottommost end of the historical transaction record page that has been scrolled to be displayed as the ending position.

In a third embodiment, the operating system may acquire an area in the historical transaction page which is dragged out by the user, and take the area as the left area after page cropping. Specifically, the user may click at certain position in the historical transaction page, and drag out an area and release his or her finger at certain other position. Then, the operating system may determine an area formed by the clicking position and the finger releasing position, and determines the starting position and the ending position of the area.

However, the operating system may also directly take the topmost end of the historical transaction page as the starting position, and the bottommost end of the historical transaction page as the ending position. That is, the entire historical transaction page is taken as the target transaction page for which a screenshot is to be taken.

It is to be noted that, for any of the above implementations for acquiring the starting position and the ending position, after the operating system acquires the starting position and the ending position, the operating system may display a preview page formed using the starting position and the ending position. The user may trigger an edit operation on the preview page, to adjust the starting position and the ending position. The operating system may take the adjusted starting position as the final starting position, and take the adjusted ending position as the final ending position.

For example, the operating system may display two arrows respectively at the starting position and the ending position of the preview page. The user may click at the arrow at the starting position, drag downward and release the finger at certain other position. Then, the operating system may take the position for releasing the finger as the final determined starting position.

In step 4013, the operating system determines the portion of the page between the starting position and the ending position as the target transaction page.

In step 402, the operating system takes a screenshot of the target transaction page to acquire a screenshot of the target transaction page.

After the target transaction page is determined, the operating system may automatically take a screenshot of the target transaction page. For a target transaction page having a length longer than the length of the screen, the screenshot operation may be referred to as an extended screenshot operation.

In step 403, the operating system performs character recognition processing on the screenshot, to recognize the characters in the screenshot.

The step 403 may specifically include the following steps 4031-4033.

In step 4031, the operating system cuts out at least one character area in the screenshot.

After the screenshot is obtained, the operating system may firstly pre-process the screenshot to reduce useless information in the screenshot. The pre-process may include binarization operation, noise reduction operation, and the like. The binarization operation transforms the colorful screenshot into a black and white screenshot. The noise reduction operation removes noise and stains in the screenshot with a noise reduction algorithm.

After the pre-processed screenshot is acquired, the operating system may search for the connected areas in the screenshots, divide each connected area searched out as a character area, and cut the character area out of the screenshot. Alternatively, the operating system may determine a size of each character area, cut the screenshot according to the size to acquire at least one character area. However, other implementations for cutting the screenshot may be employed, which is not limited in the present embodiment.

In step 4032, for each character area of the at least one character area, the operating system extracts the features of the character area.

For each character area, the operating system may extract features of the character area with a feature extraction algorithm. The features may be a stroke feature, a contour feature, a structural feature, and the like.

In step 4033, based on the features, the operating system searches in a previously established character library, and takes a character in the character library which matches the features as the character recognized in the character area.

The operating system may establish a character library in advance, and store features of the characters in the character library. When features of a character area are acquired, the operating system may traverse the character library for each character, calculate similarity between the features of the character area and features of each character obtained through the traverse operation. If the similarity is greater than a predetermined threshold, the character obtained through the traverse operation is determined as a character matching with the character area. That is, the character is taken as the character recognized in the character area.

In step 404, the operating system combines the recognized characters to obtain at least one transaction record included in the target transaction page.

When at least one character corresponding to the at least one character area is recognized, the operating system may arrange the at least one character according to the arranging order of the at least one character area, and combine the arranged at least one character, to obtain a text content to be processed. Then, using the method similar to the above step 204, a target content is extracted from the text content to be processed, to obtain at least one transaction record.

Accordingly, the operating system completes the character recognition process on the target transaction page, to obtain at least one transaction record included in the target transaction page. The method for taking a screenshot of the target transaction page and recognizing characters therein may be referred to as an OCR method.

In step 405, the operating system collects the at least one transaction record into a transaction card.

This step is similar to the above step 205 and will not be repeated herein.

In the method provided by the embodiment of the present disclosure, by recognizing characters in the target transaction page, the extraction of the transaction record from the target transaction page may be implemented automatically by character recognition, thereby eliminating the need for the user to manually select a transaction record for extraction one by one. Moreover, the process is simple and may not miss any transaction record. It may improve the efficiency for acquiring a transaction record, and may extract a huge number of transaction records in a short time. It is more operative and more intelligent.

Further, the process of acquiring a transaction record from the application may be executed in background without affecting the user's use of the application, avoiding interference with the user.

Further, since the process of acquiring the transaction record is performed by the operating system without requiring the user to pay any learning cost, it is more practical.

Further, for the transaction record distributed in various applications, it is possible to extract the transaction record by the method provided in the embodiments of the present disclosure. The method is generally applicable, and may facilitate the user to manage and make statistics of the various transaction records of the user in a unified manner, eliminating the need for the user to manually search the various applications for the transaction records. Thus it may improve the customer stickiness.

It should be noted that, in addition to the methods for acquiring a transaction record described in the above three aspects, the operating system may also acquire a transaction record through short message service (SMS), interface, layer drawing rendering and other methods.

Regarding a method for acquiring a transaction record through SMS, after a user triggers a transaction operation, a server associated with the bank or a financial application generally sends a notification message to the terminal. The notification message may include a transaction record. In this case, the operating system may store features of a notification message. When it is monitored that the terminal receives a short message, it is determined whether the short message matches with the features. When it is determined that the short message matches with the features, the short message is determined as a notification message, and a transaction record is extracted from the short message.

For example, the features of a notification message may be "bank card with tail numbers **", "income yuan", "current balance yuan". Then, if the terminal receives a short message "bank card with tail numbers XXXX has income 5.2 yuan through ATM machine transfer on May 20, 2017", since the short message contains two features of "bank card with tail numbers XXXX" and "income yuan", this message may be determined as a notification message, and "May 20, 2017" and "5.2 yuan" may be extracted as a transaction record.

Regarding a method for acquiring a transaction record through an interface, the operating system may provide a designated system interface. The designated system interface serves each application on the terminal, and is an open interface for each application to report a transaction event associated with the application to the operating system. Then, when a transaction event occurs in an application, the application may actively send a broadcast message to the operating system through the designated system interface. After receiving the broadcast message from the application, the operating system may extract a transaction record from the broadcast message.

For an application, when the terminal completes a transaction event through the application, the application may respond to the transaction event, and generate a broadcast message for the transaction event according to a previously prescribed interface specification. The broadcast message carries a transaction record. After receiving the broadcast message, the operating system parses the broadcast message, to obtain the transaction record.

Regarding a method for acquiring a transaction record through layer drawing rendering, the terminal may determine a target transaction page to be recognized through the above step 201. During the process of rendering the target transaction record page, the rendered text content or the text content to be rendered is taken as a text content to be processed. A transaction record may be obtained from the text content to be processed through the above step 204.

In sum, six methods for acquiring a transaction record respectively through a DOM structure, node injection OCR recognition, SMS, interface and rendering layer drawing have been described above. Based on the six methods for acquiring a transaction record, an embodiment of the present disclosure provides a method for displaying a transaction record. With the displaying method, the operating system may organize the transaction records from various financial applications, and display them uniformly on a designated interface. The displaying method may refer to the following fourth aspect.

In a fourth aspect, an embodiment of the present disclosure provides a method for displaying a transaction record.

Figure 5A:
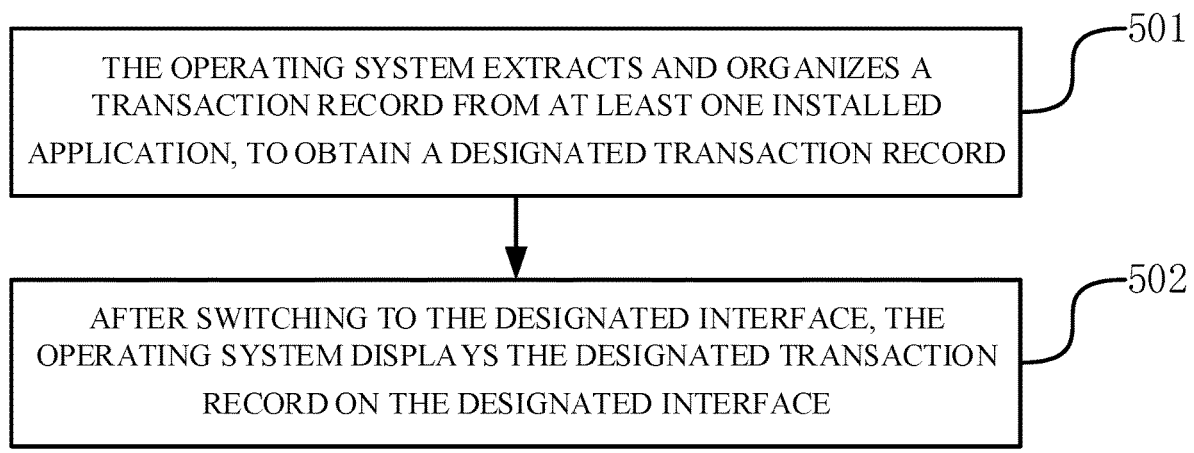
FIG. 5A is a flow chart illustrating a method for displaying a transaction record according to an exemplary embodiment.

Referring to FIG. 5A, FIG. 5A is a flow chart illustrating a method for displaying a transaction record according to an exemplary embodiment. The method is performed by an operating system of a terminal. The method includes the following steps.

In step 501, the operating system extracts and organizes a transaction record from at least one installed application, to obtain a designated transaction record.

The operating system may collect a transaction record of an application through the methods described in the above embodiments, and determine a designated transaction record from the collected at least one transaction record. The designated transaction record is displayed on the designated interface. The designated transaction record may be a transaction record of a transaction event that occurred recently, or may be obtained through statistics of at least one transaction record over a recent time period.

In a first embodiment, the operating system may take a transaction record with a transaction occurring time closest to the current time as the designated transaction record. The designated transaction record at least includes a transaction amount, a transaction occurring time and a transaction name. For this implementation, the operating system may sort the collected at least one transaction record in a reverse chronological order of the transaction occurring times, and select the transaction record in the first place as the designated transaction record.

In a second embodiment, the operating system may determine at least one transaction record with a transaction occurring time within a designated time period, acquire a transaction amount of each transaction record of the at least one transaction record, calculate statistical information of the at least one transaction amount, to obtain a sum of the at least one transaction amount, and obtain the designated transaction record.

The ending point of the designated time period may be the current time, and the starting point may be determined according to the current time and a statistical period. The statistical period may be one day, one month, or may be determined according to the user's setting operation. For example, when the current time is 20:00 on May 20, and the statistical period is one day, the designated time period refers to a time period from 0:00 to 20:00 on May 20. When the statistical period is one month, the designated time period refers to a time period from 0:00 on May 1 to 20:00 on May 30.

For a designated time period, for each transaction record of the collected at least one transaction record, the operating system may extract the transaction occurring time of the transaction record, and determine whether the transaction occurring time falls within the designated time period. When the transaction occurring time falls within the designated time period, the operating system acquires the transaction amount included in the transaction record.

When the transaction amount of the at least one transaction record having a transaction occurring time within the designated time period is acquired, the operating system calculates a sum of the acquired at least one transaction amount, and takes the sum as a cumulative amount of the transaction amount, to obtain a designated transaction record including the designated time period and the cumulative amount of the transaction amount.

After obtaining the designated transaction record, the operating system stores the designated transaction record for subsequent accessing and displaying the stored designated transaction record.

In step 502, after switching to the designated interface, the operating system displays the designated transaction record on the designated interface.

When receiving an interface switching instruction, the operating system responds to the interface switching instruction, and switches to the designated interface. The designated interface may be triggered by a detected sliding operation. For example, when a leftward sliding operation is detected on the main screen interface, an interface switching instruction for switching to the Hiboard screen is acquired, and the interface is switched to the Hiboard screen.

Figure 5B:
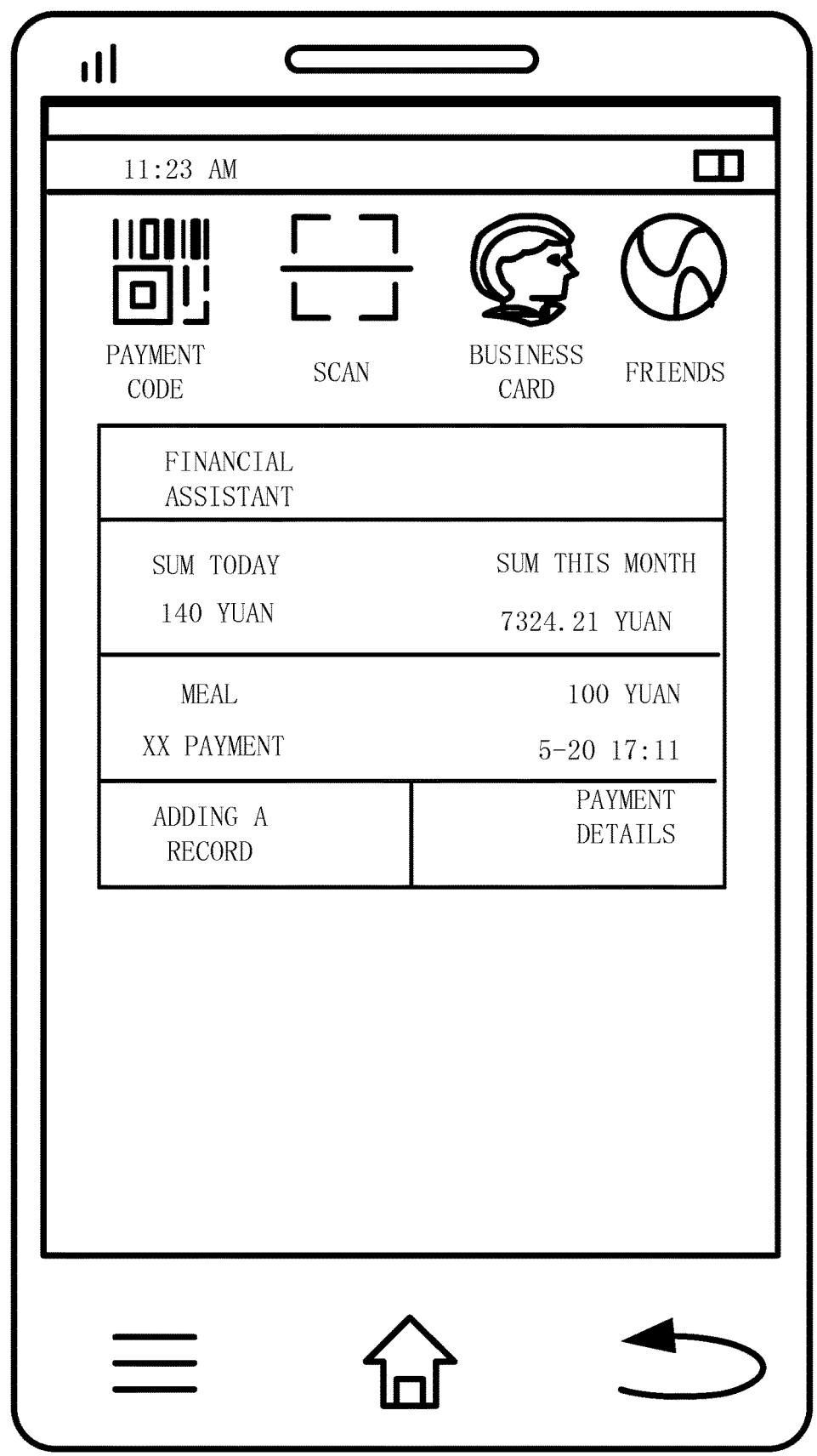
FIG. 5B is a schematic diagram of a transaction card according to an exemplary embodiment.

In order to display the designated transaction record neatly and clearly, the operating system may display a transaction card on the designated interface, and the designated transaction record may be displayed on the transaction card in form of an information entry (as shown in FIG. 5B).

For the displaying style of the designated transaction record in the information entry, the operating system may set a display specification for the designated transaction record in advance. The display specification is for specifying the displaying style of the various contents in the transaction record. The various contents include transaction amounts, transaction occurring times, transaction names, and so on. The display style includes a font, a size, a position, an interval, an icon, and so on. Then, the operating system may determine the display style according to the display specification, and display the various contents of the designated transaction.

In another embodiment, in addition to providing a function for displaying the designated transaction record, the transaction card may also provide at least one of the following functions: adding a transaction record and presenting details of a transaction record.

Regarding the function for adding a transaction record, the operating system may acquire a record adding instruction on the transaction card of the designated interface, and display an input interface in response to the record adding instruction. Afterwards, the operating system acquires input information on the input interface. Then, the operating system generates a newly added transaction record according to the input information, and displays the newly added transaction record on the designated interface.

Figure 5C:
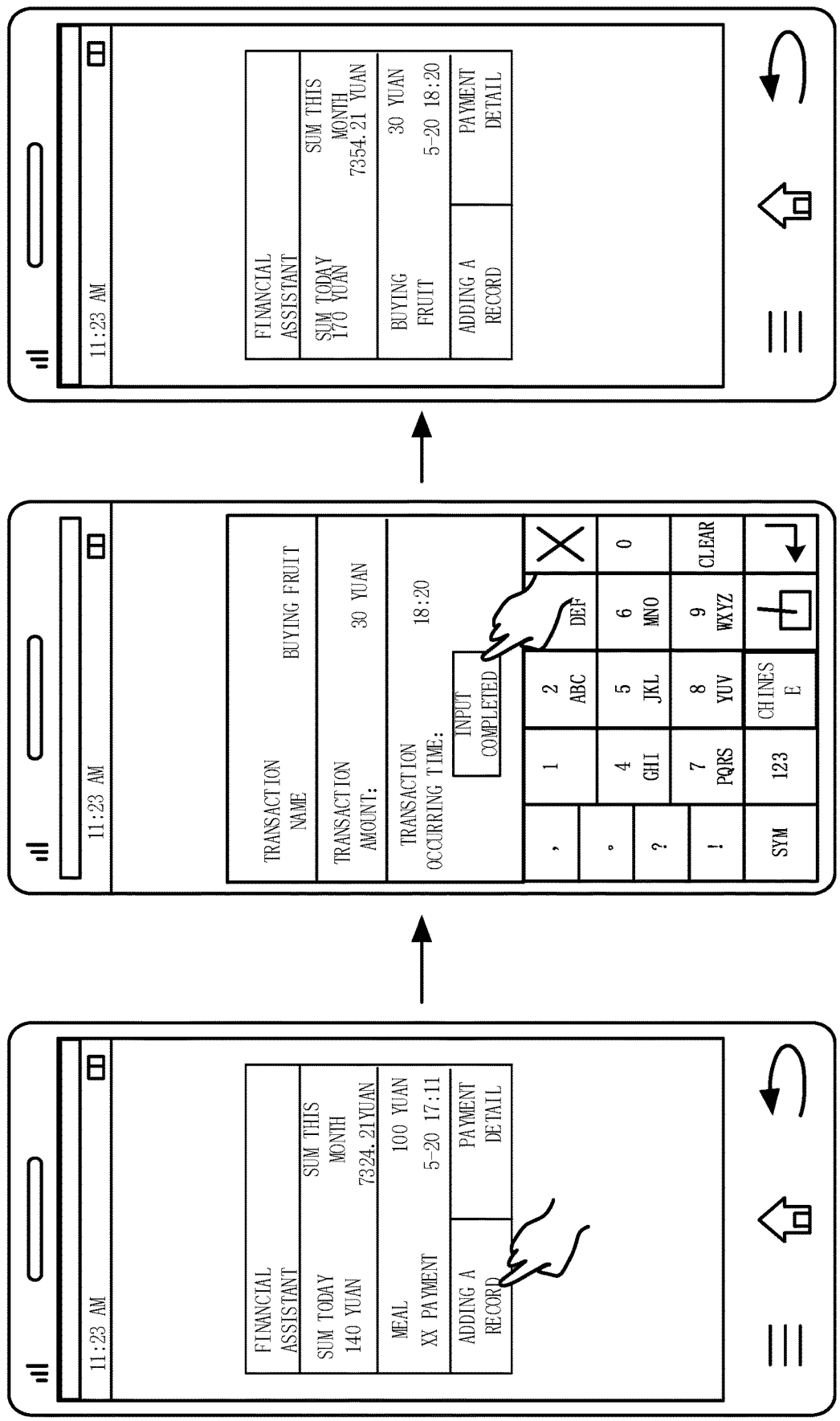
FIG. 5C is a schematic diagram of acquiring a record adding instruction according to an exemplary embodiment.

In an exemplary scenario, referring to FIG. 5C, when a confirmation operation triggered by the user on an "adding a record" option on the transaction card is detected, the operating system acquires a record adding instruction, and displays an input interface. Then, the operating system acquires "buying fruit", "30 yuan" and "18:20" inputted on the input interface, and combines the input information to generate a newly added transaction record and displays the newly added transaction record on the designated interface.

In addition, after the transaction record is added, the operating system may extract the transaction amount of the newly added transaction record, calculate a sum of the transaction amount and the previously determined cumulative amount of the transaction amount, and replace the cumulative amount of the transaction amount with the sum, to update the cumulative amount of the transaction amount.

Regarding the function for presenting details of a transaction record, the operating system may acquire a detail presenting instruction. In response to the detail presenting instruction, the operating system may display multiple transaction records in form of information entries and in a reverse chronological order of the transaction occurring times.

Figure 5D:
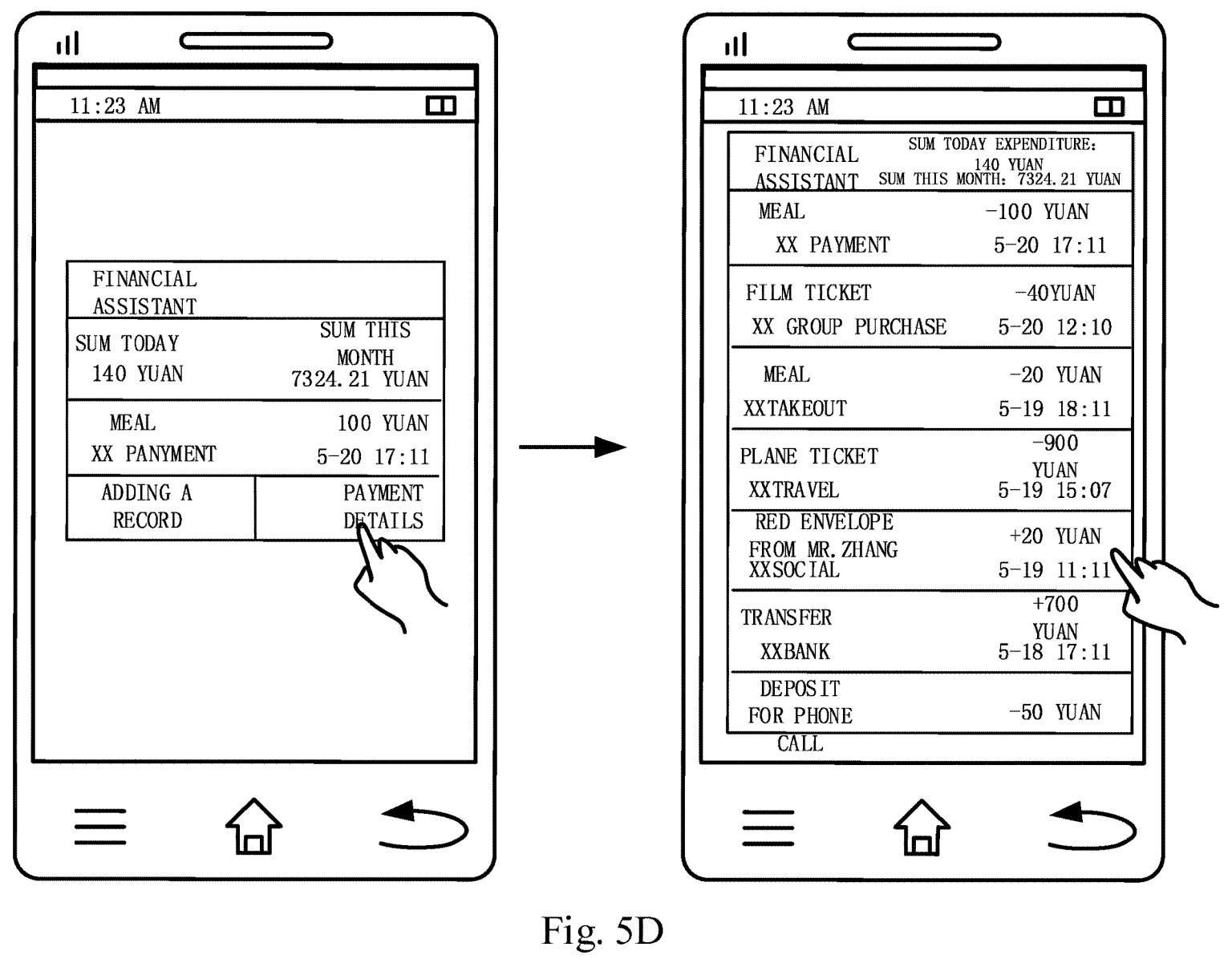

In an exemplary scenario, referring to FIG. 5D, when a confirmation operation triggered by the user on an "expenditure details" option on the transaction card is detected, the operating system may acquire a detail presenting instruction, jump to a main page of a financial assistant application, and display multiple transaction records on the page.

Taking into account the fact that users usually tend to view transaction records that occurred more recently and then earlier historical transaction records, the operating system may sort the multiple transaction records in a reverse chronological order of the transaction occurring times, and display the sorted multiple transaction records in the page. Among the multiple transaction records, the transaction record having the latest transaction occurring time is displayed at the top of the page, and the transaction record having the earliest transaction occurring time is displayed at the bottom of the page.

In addition, when detecting a sliding operation, the operating system may also display other transaction records than the multiple transaction records in a scrolling manner, according to the reverse chronological order of the transaction occurring times, to facilitate the user to learn about more transaction records.

A first point to be noted is that displaying the multiple transaction records in the reverse chronological order of the transaction occurring times described above is only an example. For a practical application, the operating system may also display multiple transaction records in another order, for example, in a descending order of the transaction amounts.

A second point to be noted is that, for the multiple transaction records, the operating system may acquire a filtering instruction, and display transaction records left after filtering the multiple transaction records. The filtering instruction may be filtering to leave transaction record(s) of a designated application, filtering to leave transaction record(s) with a designated transaction party, filtering to leave transaction record(s) with a designated transaction name, and so on. For example, when the filtering instruction is filtering to leave transaction record(s) of a XX take-out application, the operating system traverses the multiple transaction records for the provider of each transaction record, and filters the multiple transaction records to leave transaction record(s) provided by the XX take-out application. For another example, when the filtering instruction is filtering to leave transaction record(s) with transaction party "Mr. ZHANG", the operating system may traverse the multiple transaction records for the transaction party of each transaction record, and filters the multiple transaction records to leave transaction record(s) with a transaction party "Mr. ZHANG".

A third point to be noted is that the operating system may also delete, modify, or perform other operation on each transaction record of the multiple transaction records.

Regarding the process of deleting a transaction record, for each transaction record of the multiple transaction records, the operating system may acquire a record deleting instruction on the information entry where the transaction record is located, and in response to the record deleting instruction, delete the transaction record.

Regarding the process of acquiring a record deleting instruction, for each transaction record, a deletion option may be displayed on the information entry where the transaction record is located. Alternatively, when a selecting operation triggered on the information entry is detected, the deletion option is displayed. When a confirmation operation on the deletion option is detected, the operating system acquires the record deleting instruction and in turn, deletes the transaction record. In addition, the operating system may display a prompt message after acquiring the record deleting instruction, to inquire the user whether to delete the transaction record. When a confirmation operation on the prompt message is detected, the transaction record is deleted.

In addition, before deleting the transaction record, the operating system may extract the transaction amount of the transaction record to be deleted, and update the cumulative amount of the transaction amount accordingly. When the transaction amount is an expenditure transaction amount, the current cumulative amount of the transaction amount is updated by adding the transaction amount thereto, and when the transaction amount is an income transaction amount, the current cumulative amount of the transaction amount is updated by subtracting the transaction amount therefrom.

Figure 5E:
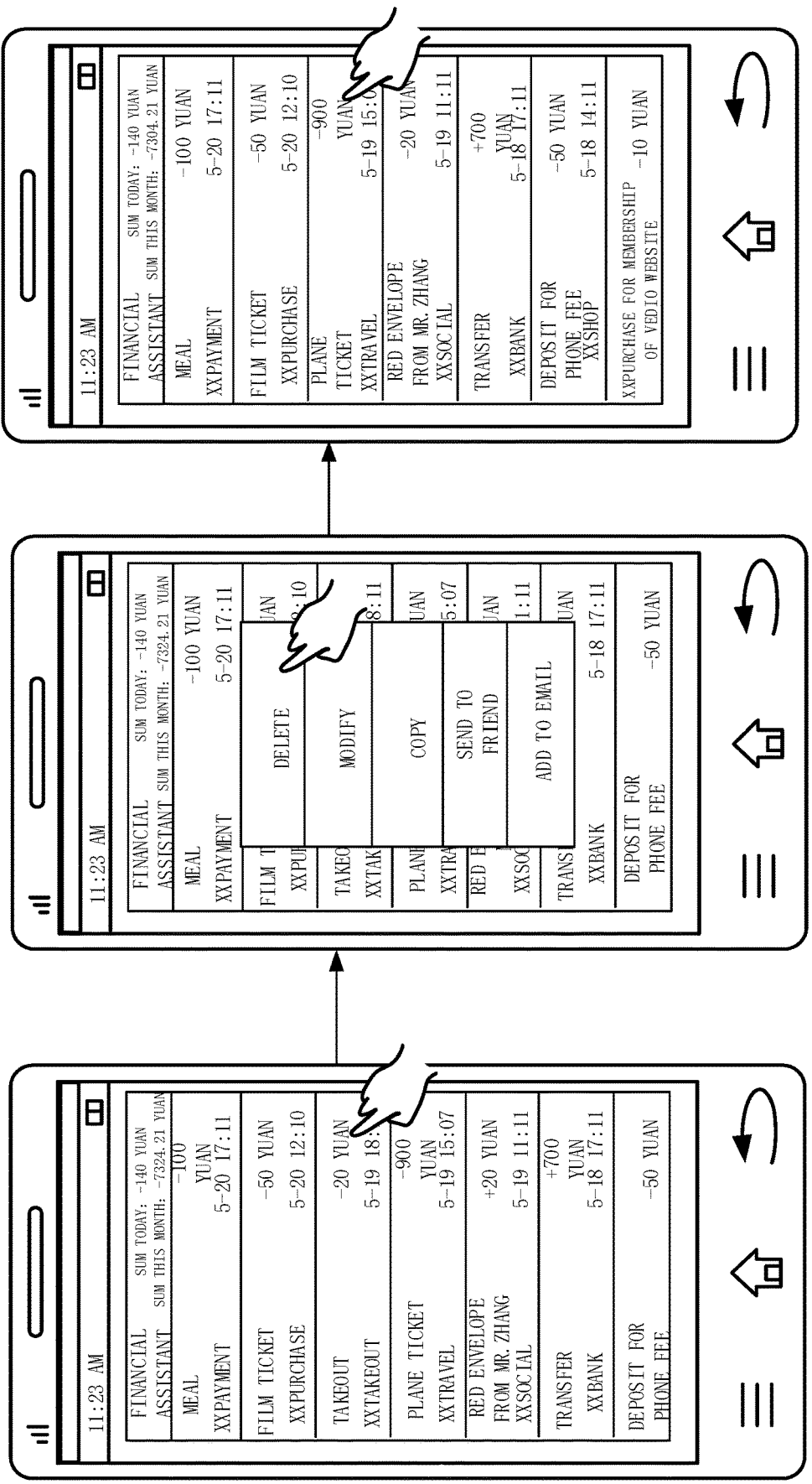
FIG. 5E is a schematic diagram of deleting a transaction record according to an exemplary embodiment.

For example, referring to FIG. 5E, when a selection operation is detected to be triggered on the information entry where the transaction record corresponding to "takeout" is located, the operating system may display a deletion option. When a confirmation operation on the deletion option is detected, the transaction record is deleted. Moreover, since the transaction amount of the transaction record is 20 yuan, the operating system may update the cumulative expenditure 7324.24 yuan of this month to 7304.21 yuan.

Regarding the process of modifying a transaction record, for each transaction record of the multiple transaction records, the operating system may acquire a record modifying instruction on the information entry where the transaction record is located, and in response to the record modifying instruction, display the transaction record as modifiable. Then, modification information to the transaction record is acquired, and the transaction record is updated according to the modification information.

Regarding the process of acquiring a record modifying instruction, for each transaction record, a modification option may be displayed on the information entry where the transaction record is located. Alternatively, when a selecting operation triggered on the information entry is detected, the modification option is displayed. When a confirmation operation on the modification option is detected, the operating system acquires the record modifying instruction.

Regarding the process of displaying the transaction record as modifiable, the operating system may display various contents (the transaction amount, the transaction occurring time, the transaction name) of the transaction record as modifiable. For example, displaying the transaction record as modifiable may refer to displaying a flickering cursor at the last digit of the transaction amount and displaying a virtual keyboard in the page. When a click operation on the virtual keyboard is detected on the virtual keyboard, information corresponding to the virtual key is taken as the modification information, and the original transaction amount is replaced with the modification information. However, the operating system may display a prompt message after acquiring the modification information, to inquire the user whether to update the transaction record. When a confirmation operation on the prompt message is detected, the transaction record is updated.

In addition, when updating the transaction record, the operating system may update the cumulative value of the transaction amount according to the updated transaction amount. For example, a difference value between the updated transaction amount and the transaction amount before the update may be calculated, and the cumulative value of the transaction amount may be updated by adding the difference value thereto.

Figure 5F:
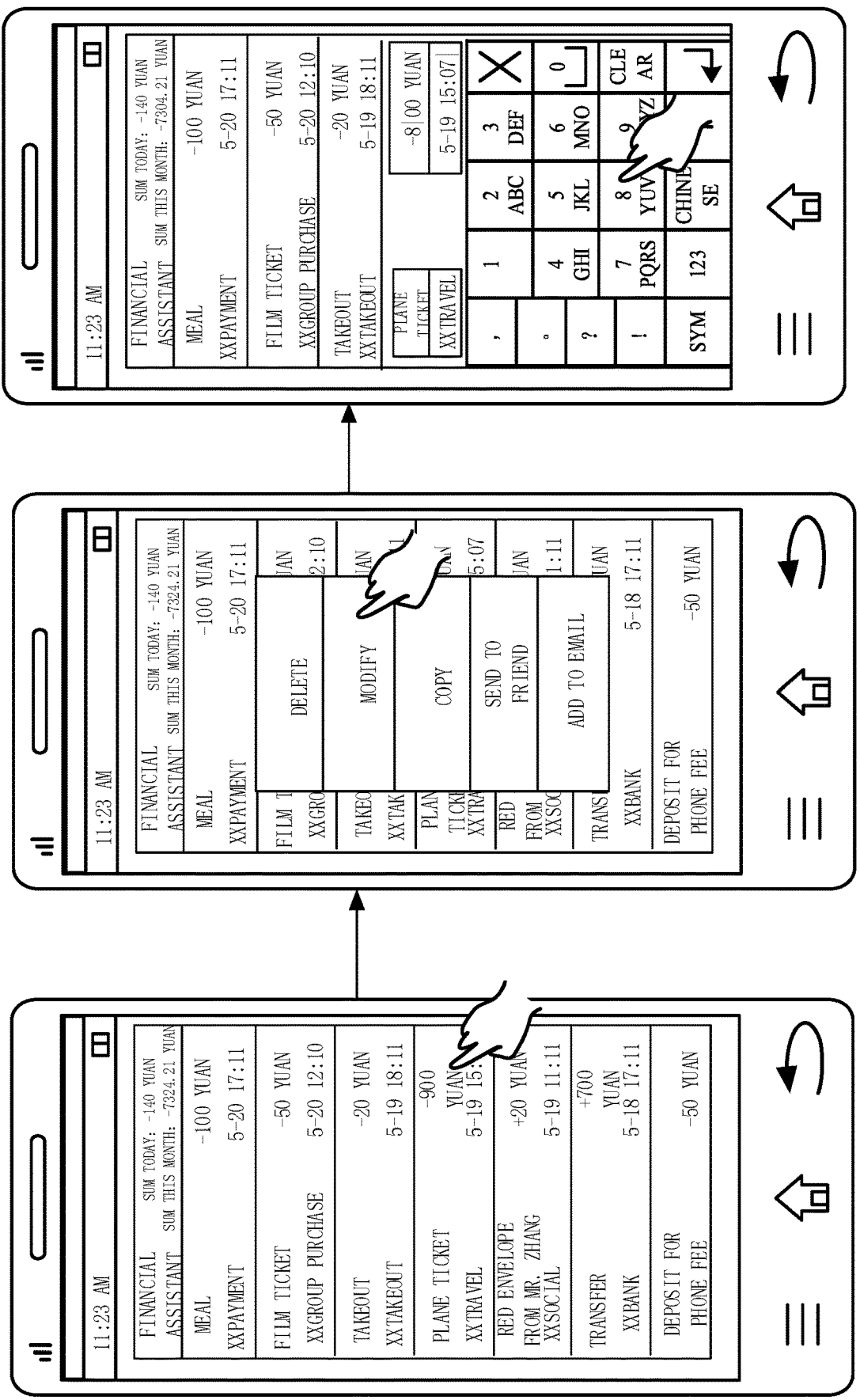
FIG. 5F is a schematic diagram of modifying a transaction record according to an exemplary embodiment.

For example, referring to FIG. 5F, when a selection operation is detected to be triggered on the information entry where the transaction record corresponding to "plane ticket" is located, the operating system may display a modification option. When a confirmation operation on the modification option is detected, the transaction record is displayed as modifiable. Moreover, since the transaction amount of the transaction record is changed from 900 yuan to 800 yuan, the operating system may update the cumulative expenditure 7324.24 yuan of this month to 7224.21 yuan.

However, the above functions of deleting operation and modifying operation on the transaction record are only examples. In practical application, the financial assistant may also have functions of copying a transaction record, sending a transaction record to a contact, etc. For example, when a selection operation of a user on a transaction record is detected, an interface to a social connection application may be invoked, and the transaction record may be sent to the contact of the user through the social connection application.

A fourth point to be noted is that, for a designated transaction record having the most recent transaction occurring time, the user may directly delete or modify the designated transaction record on the transaction card without jumping to the main interface of the financial assistant application.

Figure 5G:
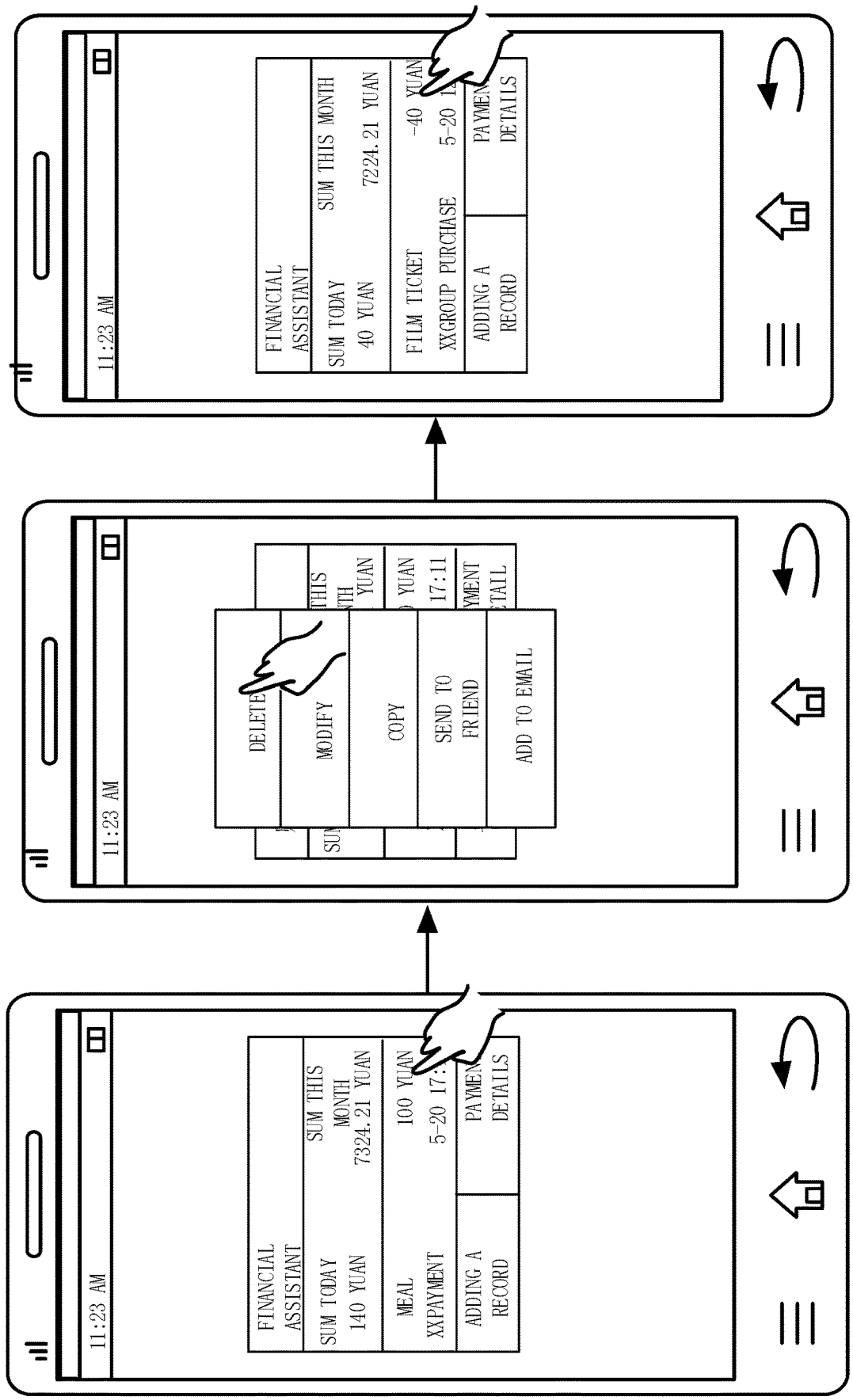
FIG. 5G is a schematic diagram of deleting a designated transaction record according to an exemplary embodiment.

For example, referring to FIG. 5G the operating system may acquire a record deleting instruction for a designated transaction record on the transaction card, and delete the designated transaction record. Moreover, after the designated transaction record is deleted, the operating system may select another designated transaction record having the latest transaction occurring time from the multiple transaction records, to switch the designated transaction record.

Figure 5H:
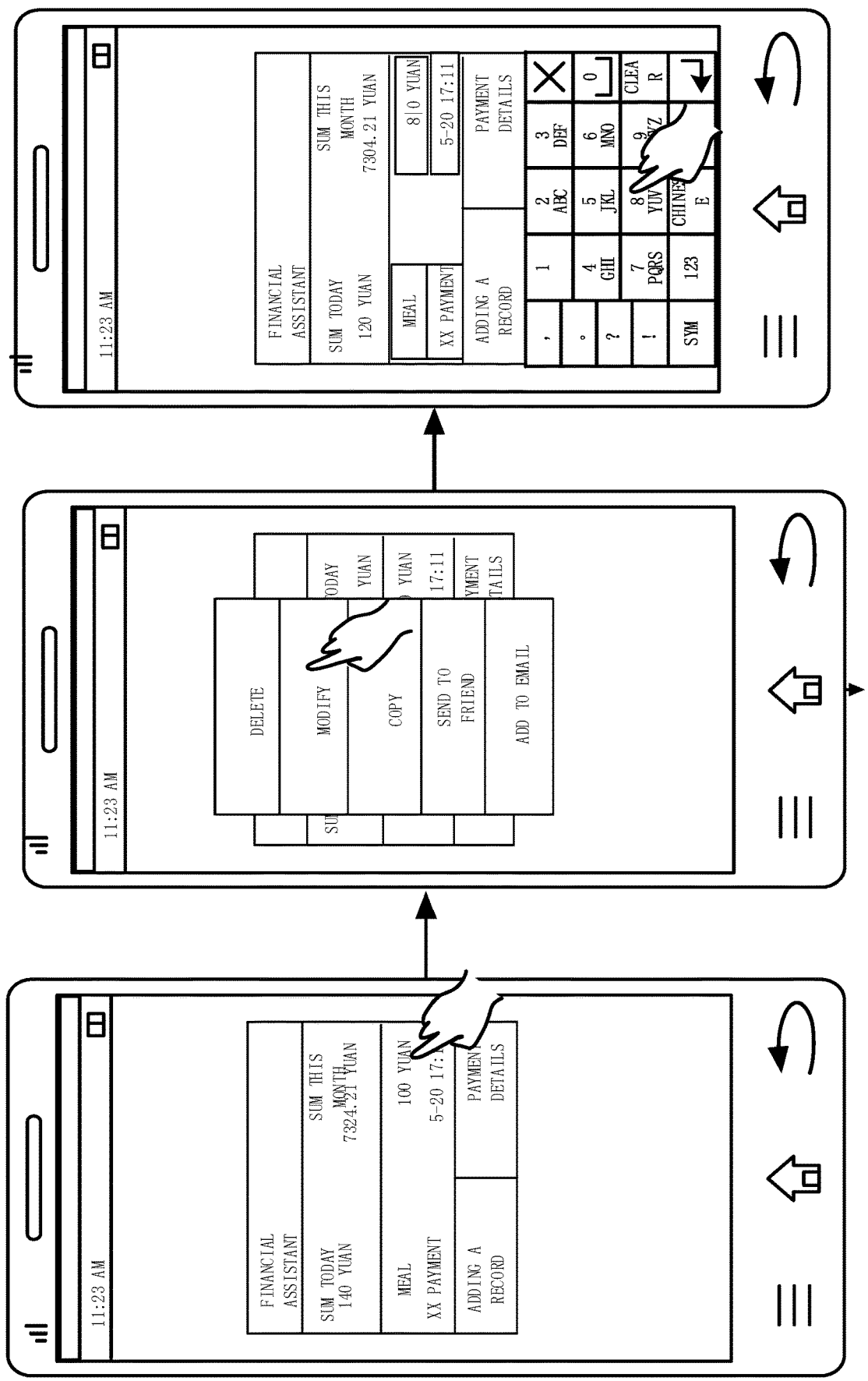
FIG. 5H is a schematic diagram of modifying a designated transaction record according to an exemplary embodiment.

For another example, referring to FIG. 5H, the operating system may acquire a record modifying instruction for a designated transaction record on the transaction card, display the designated transaction record as modifiable, acquire modification information for the designated transaction record, and update the designated transaction record according to the modification information.

In the method provided by the embodiment of the present disclosure, after the transaction record of at least one application installed in the operating system is extracted and organized to obtain a designated transaction record, the designated transaction record may be displayed on the designated interface. Since the designated transaction record may originate from at least one application of the terminal, displaying of the transaction records distributed in various applications on a designated interface may be realized, thereby eliminating the need for the user to check transaction records respectively in various applications. Moreover, any transaction record may not be missed. It may facilitate organization and summarization of the various transaction records, and is more intelligent.

Further, the user only needs to trigger an instruction for switching to the designated interface, in order to view the transaction record displayed on the designated interface, without having to perform the multiple steps of clicking an application icon→clicking a virtual button to enter a personal main page→invoking a transaction bill on the personal main page. The operation is simple, and more convenient.

Further, the user may perform, on the transaction card, deletion and modification of the transaction record that occurred most recently, and the operation is convenient. Moreover, new transaction record may be added and the historical transaction record may be deleted and modified, and thus the management manners of the transaction records may be expanded.

Figure 6A:
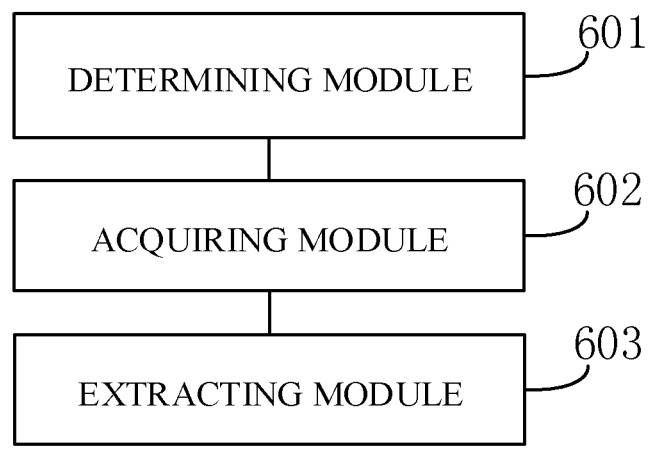
FIG. 6A is a block diagram illustrating a device for acquiring a transaction record according to an exemplary embodiment.

FIG. 6A is a block diagram illustrating a device for acquiring a transaction record according to an exemplary embodiment. Referring to FIG. 6, the device includes a determining module 601, an acquiring module 602 and an extracting module 603.

The determining module 601 is configured to determine a target transaction page to be recognized, the target transaction page originating from an application of a terminal and containing at least one transaction record of at least one transaction event.

The acquiring module 602 is configured to acquire a DOM structure of the target transaction page.

The extracting module 603 is configured to extract the at least one transaction record from the DOM structure.

In the device for acquiring a transaction record provided in the embodiment of the present disclosure, by acquiring the DOM structure of the target transaction page, it may realize automatic extraction of a transaction record in the target transaction page with the DOM structure, eliminating the need for the user to manually select a transaction record for extraction one by one. Moreover, the process is simple and will not miss any transaction record. It may improve the efficiency for acquiring a transaction record, and may extract a huge number of transaction records in a short time. It is more operative and more intelligent.

Figure 6B:
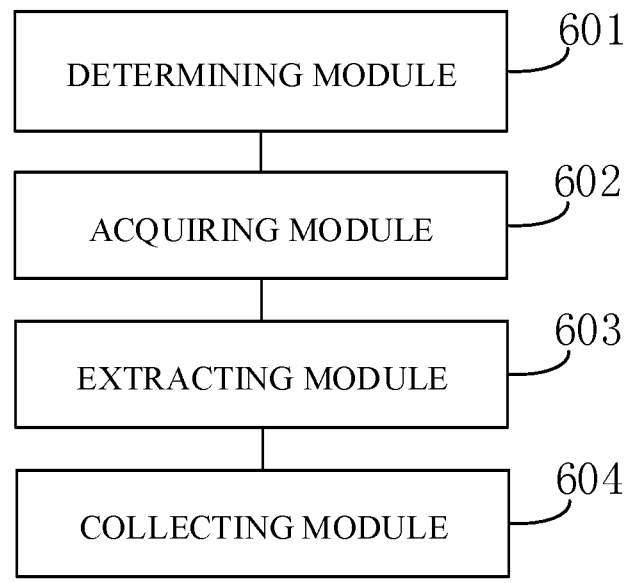
FIG. 6B is a block diagram illustrating a device for acquiring a transaction record according to an exemplary embodiment.

In an embodiment, referring to FIG. 6B, the device also includes:

a collecting module 604 configured to collect the at least one transaction record into a transaction card, and display the transaction record on a designated interface.

In an embodiment, the determining module 601 includes:

a comparing sub-module configured to compare designated address link information of a currently displayed page with address link information of at least one transaction page previously stored; and a determining sub-module configured to, when the designated address link information is consistent with address link information of any one of the at least one transaction page, determine the currently displayed page as the target transaction page.

In an embodiment, the determining module 601 includes:

an acquiring sub-module configured to acquire an information import instruction on a designated page, the designated page being a page displayed when a detail presenting instruction is acquired on a transaction card; and a displaying sub-module configured to display at least one installed application in response to the information import instruction; and the displaying sub-module is further configured to display a historical transaction record page of an application of the at least one application selected in response a selection instruction when the selection instruction is acquired; and a determining sub-module configured to determine the historical transaction record page as the target transaction page, and the historical transaction record page contains at least one historical transaction record.

In an embodiment, the extracting module 603 includes:

a determining sub-module configured to determine, in the DOM structure, at least one text node storing a text content;

a reading sub-module configured to traverse the text content stored in the at least one text node, to acquire a text content to be processed; and an extracting sub-module configured to extract a target content from the text content to be processed according to a preset text rule, to acquire the at least one transaction record.

In an embodiment, wherein the transaction record at least includes a transaction amount, a transaction occurring time and a transaction name.

With respect to the devices in the above embodiments, the specific manners for performing operations for individual modules therein have been described in detail in the embodiments regarding the relevant methods, which will not be elaborated herein.

It should be noted that, when acquiring a transaction record, the device for acquiring a transaction record provided in the above embodiments is only illustrated as the functional modules in, for example, the above division manner. In practical application, the above functions may be assigned to different functional modules as desired, that is, the internal structure of the operating system may be divided into different functional modules to accomplish all or a part of the functions described above. Besides, the above embodiments of a device for acquiring a transaction record and the embodiments of a method for acquiring a transaction record belongs to the same invention conception, and the specific operating procedure of the device may refer to the embodiments of the method. Therefore, the description thereof will not be repeated herein.

All of the above alternative technical solutions may form other alternative embodiments of the present disclosure in an arbitrary combination thereof, and the description thereof will be omitted herein.

Figure 7:
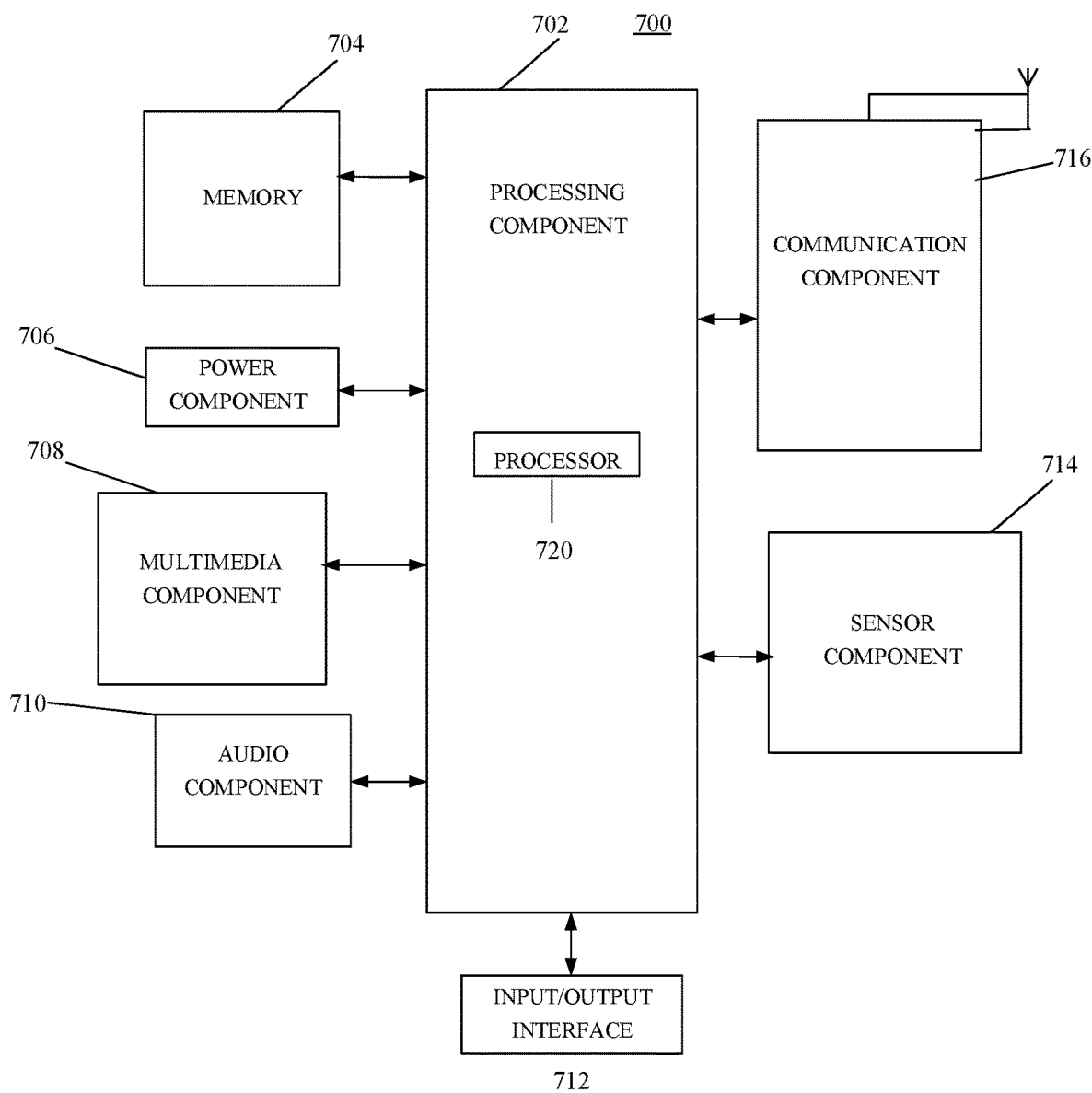
FIG. 7 is a block diagram illustrating a device for acquiring a transaction record according to an exemplary embodiment.

FIG. 7 is a block diagram illustrating a device 700 for acquiring a transaction record according to an exemplary embodiment. For example, the device 700 may be a mobile phone, a computer, a digital broadcast terminal, a messaging device, a gaming console, a tablet, a medical device, exercise equipment, a personal digital assistant, and the like.

Referring to FIG. 7, the device 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls overall operations of the device 700, such as the operations associated with display, telephone calls, data communications, camera operations, and recording operations. The processing component 702 may include one or more processors 720 to execute instructions to perform all or part of the steps in the above described methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the device 700. Examples of such data include instructions for any applications or methods operated on the device 700, contact data, phonebook data, messages, pictures, video, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the device 700. The power component 706 may include a power management system, one or more power sources, and any other components associated with the generation, management, and distribution of power in the device 700.

The multimedia component 708 includes a screen providing an output interface between the device 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 708 includes a front camera and/or a rear camera. The front camera and the rear camera may receive an external multimedia datum while the device 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone ("MIC") configured to receive an external audio signal when the device 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals.

The I/O interface 712 provides an interface between the processing component 702 and peripheral interface modules, such as a keyboard, a click wheel, buttons, and the like. The buttons may include, but are not limited to, a home button, a volume button, a starting button, and a locking button.

The sensor component 714 includes one or more sensors to provide status assessments of various aspects of the device 700. For instance, the sensor component 714 may detect an open/closed status of the device 700, relative positioning of components, e.g., the display and the keypad, of the device 700, a change in position of the device 700 or a component of the device 700, a presence or absence of user contact with the device 700, an orientation or an acceleration/deceleration of the device 700, and a change in temperature of the device 700. The sensor component 714 may include a proximity sensor configured to detect the presence of nearby objects without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate communication, wired or wirelessly, between the device 700 and other devices. The device 700 can access a wireless network based on a communication standard, such as WiFi, 2G, or 3G, or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 704, executable by the processor 720 in the device 700, for performing the above-described methods. For example, the non-transitory computer-readable storage medium may be a ROM, a RAM, a CD-ROM, a magnetic tape, a floppy disc, an optical data storage device, and the like.

A non-transitory computer readable storage medium, when instructions in the storage medium are executed by a processor of an operating system, enables the operating system to perform the method for acquiring a transaction record in the above embodiments. The method includes: determining a target transaction page to be recognized, the target transaction page originating from an application of a terminal and containing at least one transaction record of at least one transaction event; acquiring a Document Object Model DOM structure of the target transaction page; and extracting the at least one transaction record from the DOM structure.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A method for acquiring a historical transaction record, comprising: acquiring an information import instruction on a designated pate, the designated pate being a pate displayed when a detail presenting instruction is acquired on a transaction card; displaying applications installed on a terminal in response to the information import instruction; selecting a plurality of applications from the installed applications; displaying historical transaction record pages of the selected applications, wherein the historical transaction record pages contain at least one historical transaction record of at least one historical transaction event; determining the historical transaction record pages of the selected applications as target transaction pages to be recognized; acquiring Document Object Model (DOM) structures of the target transaction pages; extracting the at least one historical transaction record from the DOM structures; and saving the at least one historical transaction record as an editable card.

2. The method according to claim 1, wherein the editable card is displayable on a designated interface.

3. The method according to claim 1, wherein extracting the at least one historical transaction record from the DOM structures comprises: determining, in the DOM structures, at least one text node storing a text content; traversing the text content stored in the at least one text node to acquire text content to be processed; and extracting a target content from the text content to be processed according to a preset text rule, to acquire the at least one historical transaction record.

4. The method according to claim 1, wherein the historical transaction record at least comprises a transaction amount, a transaction occurring time and a transaction name.

5. The method according to claim 2, wherein the historical transaction record at least comprises a transaction amount, a transaction occurring time and a transaction name.

6. The method according to claim 1, wherein the historical transaction record at least comprises a transaction amount, a transaction occurring time and a transaction name.

7. The method according to claim 3, wherein the historical transaction record at least comprises a transaction amount, a transaction occurring time and a transaction name.

8. A device for acquiring a historical transaction record, comprising: a processor; and a memory for storing instructions executable by the processor, wherein the processor is configured to: acquire an information import instruction on a designated pate, the designated pate being a pate displayed when a detail presenting instruction is acquired on a transaction card; display applications installed on a terminal in response to the information import instruction; select a plurality of applications from the installed applications; display historical transaction record pages of the selected applications, wherein the historical transaction record pages contain at least one historical transaction record of at least one historical transaction event; determine the historical transaction record pages of the selected applications as target transaction pages to be recognized; acquire DOM structures of the target transaction pages; extract the at least one historical transaction record from the DOM structures; and save the at least one historical transaction record as an editable card.

9. The device according to claim 8, wherein the editable card is displayable on a designated interface.

10. The device according to claim 8, wherein the processor is further configured such that extracting the at least one historical transaction record from the DOM structures comprises: determining, in the DOM structures, at least one text node storing a text content; traversing the text content stored in the at least one text node, to acquire text content to be processed; and extracting a target content from the text content to be processed according to a preset text rule, to acquire the at least one historical transaction record.

11. The device according to claim 8, wherein the historical transaction record at least comprises a transaction amount, a transaction occurring time and a transaction name.

12. A computer readable storage medium having stored therein computer program instructions that, when executed by a processor, perform a method which comprises: acquiring an information import instruction on a designated pate, the designated pate being a pate displayed when a detail presenting instruction is acquired on a transaction card; displaying applications installed on a terminal in response to the information import instruction; selecting a plurality of applications from the installed applications; displaying historical transaction record pages of the selected applications, wherein the historical transaction record pages contain at least one historical transaction record of at least one historical transaction event; determining the historical transaction record pages of the selected applications as target transaction pages to be recognized; acquiring Document Object Model (DOM) structures of the target transaction pages; extracting the at least one historical transaction record from the DOM structures; and saving the at least one historical transaction record as an editable card.

13. The storage medium according to claim 12, wherein the editable card is displayable on a designated interface.

14. The storage medium according to claim 12, wherein the step of extracting the at least one historical transaction record from the DOM structures comprises: determining, in the DOM structures, at least one text node storing a text content; traversing the text content stored in the at least one text node to acquire text content to be processed; and extracting a target content from the text content to be processed according to a preset text rule, to acquire the at least one historical transaction record.

15. The storage medium according to claim 12, wherein the historical transaction record at least comprises a transaction amount, a transaction occurring time and a transaction name.

* * * * *